United States Patent
Celikkol et al.

(10) Patent No.: US 9,812,018 B2
(45) Date of Patent: Nov. 7, 2017

(54) OPTICAL BASED POSE DETECTION FOR MULTIPLE UNMANNED UNDERWATER VEHICLES

(71) Applicant: University of New Hampshire, Durham, NH (US)

(72) Inventors: Barbaros Celikkol, Durham, NH (US); Firat Eren, Durham, NH (US); Shachak Peéri, Silver Spring, MD (US); Yuri Rzhanov, Nottingham, NH (US); M. Robinson Swift, Durham, NH (US); May-Win Thein, Lee, NH (US)

(73) Assignee: University of New Hampshire, Durham, NH (US)

( * ) Notice: Subject to any disclaimer, the term of this patent is extended or adjusted under 35 U.S.C. 154(b) by 0 days.

(21) Appl. No.: 14/680,447

(22) Filed: Apr. 7, 2015

(65) Prior Publication Data
US 2016/0253906 A1    Sep. 1, 2016

Related U.S. Application Data

(60) Provisional application No. 61/976,802, filed on Apr. 8, 2014.

(51) Int. Cl.
| | | |
|---|---|---|
| *G05D 1/00* | (2006.01) | |
| *G08G 3/00* | (2006.01) | |
| *G01S 3/784* | (2006.01) | |
| *B63G 8/00* | (2006.01) | |
| *G05D 1/12* | (2006.01) | |

(Continued)

(52) U.S. Cl.
CPC ............... *G08G 3/00* (2013.01); *B63G 8/001* (2013.01); *G01S 3/784* (2013.01); *G05D 1/12* (2013.01); *G08C 23/00* (2013.01); *H04B 13/02* (2013.01); *B63B 2203/00* (2013.01);
(Continued)

(58) Field of Classification Search
CPC .......... B63G 8/001; G01S 3/784; G05D 1/12; G08C 23/00; H04B 13/02; B63B 2203/00; B63B 2211/02; B63B 2702/12; B63B 2702/14
See application file for complete search history.

(56) References Cited

U.S. PATENT DOCUMENTS

| | | |
|---|---|---|
| 6,556,282 B2 | 4/2003 | Jamieson et al. |
| 6,700,835 B1 | 3/2004 | Ward et al. |

(Continued)

OTHER PUBLICATIONS

International Search Report received in PCT Application No. PCT/US2015/24667, dated Jan. 7, 2016, 2 pages.

(Continued)

*Primary Examiner* — Ian Jen
(74) *Attorney, Agent, or Firm* — Finch & Maloney PLLC

(57) ABSTRACT

A system and method for optical communication between multiple UUVs, more specifically, for leader-follower formations between UUVs. The system focuses on the characterization and modeling of a 1-dimensional and/or 3-dimensional light field produced from a light source mounted on a Leader UUV, which is detected by one or more follower UUVs. Communication algorithms are used to monitor the UUV's motion and orientation utilizing simulators, look up tables, and the like. A variety of detectors arrays can be used in a variety of wavelengths depending on the desired application.

21 Claims, 25 Drawing Sheets

(51) Int. Cl.
*G08C 23/00* (2006.01)
*H04B 13/02* (2006.01)

(52) U.S. Cl.
CPC ....... *B63B 2211/02* (2013.01); *B63B 2702/12* (2013.01); *B63B 2702/14* (2013.01); *B63G 2008/004* (2013.01)

(56) References Cited

U.S. PATENT DOCUMENTS

| | | | |
|---|---|---|---|
| 8,226,042 | B1 | 7/2012 | Howell et al. |
| 8,768,620 | B2 | 7/2014 | Miller et al. |
| 8,908,476 | B2 | 12/2014 | Chun et al. |
| 8,965,682 | B2 | 2/2015 | Tangirala et al. |
| 8,983,682 | B1* | 3/2015 | Peeters ................ B64C 39/024 244/190 |
| 9,223,025 | B2 | 12/2015 | Debrunner et al. |
| 9,229,108 | B2 | 1/2016 | Debrunner et al. |
| 2004/0030570 | A1 | 2/2004 | Solomon |
| 2005/0088318 | A1 | 4/2005 | Liu et al. |
| 2008/0300742 | A1 | 12/2008 | Weaver et al. |
| 2010/0168949 | A1 | 7/2010 | Malecki et al. |
| 2010/0204964 | A1 | 8/2010 | Pack et al. |
| 2010/0269143 | A1* | 10/2010 | Rabowsky ......... H04B 7/18591 725/63 |
| 2011/0229141 | A1 | 9/2011 | Chave et al. |
| 2014/0012434 | A1 | 1/2014 | Spence et al. |
| 2014/0220923 | A1* | 8/2014 | Shoshan ............. H04W 84/005 455/404.1 |
| 2014/0300885 | A1 | 10/2014 | Debrunner et al. |
| 2015/0378361 | A1 | 12/2015 | Walker et al. |
| 2016/0129363 | A1* | 5/2016 | Wong .................... A63H 37/00 446/475 |
| 2016/0253906 | A1 | 9/2016 | Celikkol et al. |
| 2016/0266246 | A1 | 9/2016 | Hjelmstad |

OTHER PUBLICATIONS

International Preliminary Report on Patentability received in PCT Application No. PCT/US2015/24667, dated Oct. 12, 2016.

* cited by examiner

| INPUT | | | | OUTPUT | | | | |
|---|---|---|---|---|---|---|---|---|
| y (m) | z (m) | yaw (degrees) | pitch (degrees) | $Sk_x$ | $Sk_y$ | SAM (degrees) | Max row | Max col |
| 0 | 0.03 | 24 | 3 | -0.450 | -0.040 | 6.55 | 10 | 18 |
| 0 | 0.03 | 24 | 6 | -0.450 | 0.017 | 6.47 | 11 | 18 |
| 0 | 0.03 | 24 | 9 | -0.456 | 0.072 | 6.48 | 12 | 18 |
| 0 | 0.03 | 24 | 12 | -0.462 | 0.126 | 6.58 | 13 | 18 |
| 0 | 0.03 | 24 | 15 | -0.465 | 0.185 | 6.75 | 14 | 18 |
| 0 | 0.03 | 24 | 18 | -0.467 | 0.239 | 6.98 | 14 | 18 |
| 0 | 0.03 | 24 | 21 | -0.477 | 0.293 | 7.26 | 15 | 18 |
| 0 | 0.03 | 24 | 24 | -0.484 | 0.348 | 7.57 | 16 | 18 |

Figure 8

| | Initial Position (m) (x,y) | Desired Final Position (x,y) | Final Position (m) (x,y) | Desired Offset (m) (x, y) | Final Offset (m) | Controller Parameters |
|---|---|---|---|---|---|---|
| Leader UUV | (4,0) | (5,0.5) | (5.26,0.5) | $\Delta x_d=4$ | $\Delta x=3.97$ | P=50 D=8 |
| Follower UUV | (0,0) | (1,0.5) | (1.29,0.55) | $\Delta y_d=0$ | $\Delta y=0.05$ | P=50 D=8 |

Figure 9

OPTICAL BASED POSE DETECTION FOR MULTIPLE UNMANNED UNDERWATER VEHICLES

CROSS-REFERENCE TO RELATED APPLICATIONS

The present application claims the benefit of Provisional Patent Application Ser. No. 61/976,802 filed Apr. 8, 2014, which is incorporated herein by reference.

STATEMENT REGARDING FEDERALLY SPONSORED RESEARCH OR DEVELOPMENT

This invention was made with government support. The government has certain rights in the invention.

FIELD OF THE INVENTION

The present invention relates to unmanned underwater vehicles (UUVs) and more particularly to a method and system to use pose detection in multiple degrees of freedom to produce coordinated motion between multiple UUVs.

BACKGROUND OF THE INVENTION

Unmanned Underwater Vehicles (UUVs) are used in underwater operations that are difficult and dangerous for human divers. Such operations include search and rescue missions, inspection of large underwater structures, bathymetry exploration, underwater pipeline and cable installations, military applications such as minesweeping, harbor monitoring and submarine detection, investigations of shipwrecks, non-invasive observation of marine wildlife and sea/ocean floors, and the like. Developing a Dynamic Positioning (DP) system using optical communication sensor systems would enable the simultaneous control of multiple UUVs. With the use of a multiple UUV system, instead of using only a single UUV at a time, the efficiency of performing underwater operations would be significantly increased, reducing mission time and costs. In addition, by using cost-efficient optical sensors, as opposed to expensive acoustic sensors, operating and manufacturing these UUV systems would further reduce UUV mission costs. Because of this research, UUV systems could be more widely accessible and could more effectively help perform dangerous underwater operations without risk to human divers.

SUMMARY OF THE INVENTION

It has been recognized that developing a Dynamic Positioning (DP) system using optical communication sensor systems would enable the simultaneous control of multiple UUVs. Typically, the applications that utilize UUVs take place in deep-sea environments and include heavy-duty tasks that may take a long time and therefore, are not suitable to be performed by divers. In certain embodiments of the present invention, multiple UUVs can be used simultaneously for these tasks and can be controlled by one operator using a leader-follower system. In typical UUV leader-follower formation systems acoustics are used as the main method of communication between the vehicles. However, hardware (e.g., acoustic transducers) can be very costly and are limited by the logistics required in modifying the leader UUV. Optical communication modules can provide an alternative cost-efficient approach. In certain embodiments of the present invention, an optical communication link between UUVs is used to form a leader follower formation. UUV's use light sources to illuminate the seafloor, and in certain embodiments, this hardware can be used as a beacon for aligning follower UUVs.

These aspects of the invention are not meant to be exclusive and other features, aspects, and advantages of the present invention will be readily apparent to those of ordinary skill in the art when read in conjunction with the following, description, appended claims, and accompanying drawings.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being, placed upon illustrating the principles of the invention.

FIG. 1B(1) is a schematic illustration of a planar array used in one embodiment of the present invention.

FIG. 1B(2) is a schematic illustration of a planar array used in one embodiment of the present invention.

FIG. 8 represents one embodiment of a look op table of the system of the present invention.

FIG. 9 shows the leader follower behavior for one embodiment of the system of the present invention.

DETAILED DESCRIPTION OF THE INVENTION

Figure 1A:
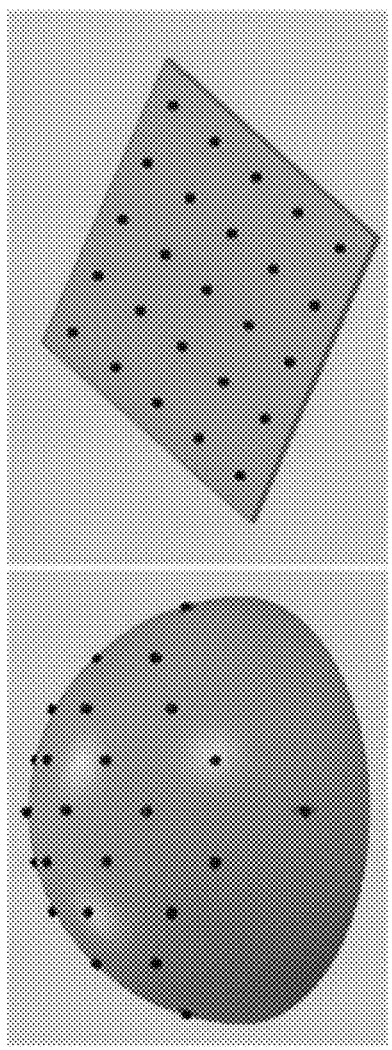
FIG. 1A is a schematic illustration of a circular array used in one embodiment of the present invention.
Figure 1A:
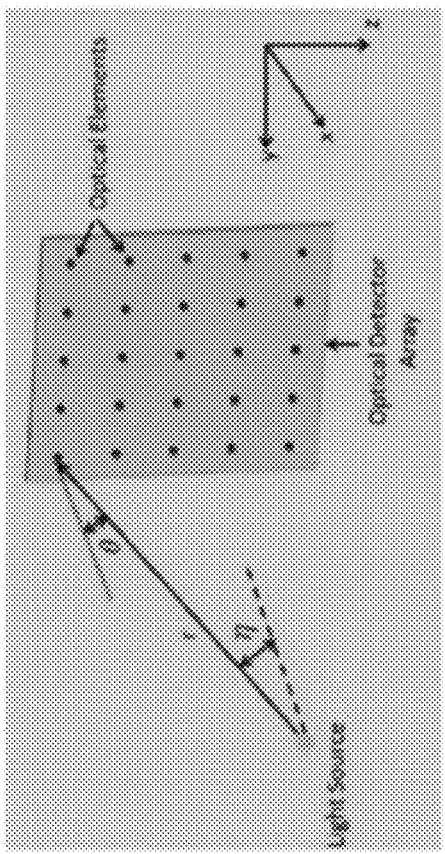

Over the past few decades, the control and mechanics of UUVs have advanced to allow commercial underwater operations, such as inspection of underwater infrastructure, seafloor mapping, the installation of cables and pipes, and the like. The use of multiple UUVs, as opposed to a single UUV, for any such mission can reduce survey/operation time and improve overall system performance. However, enabling communication between all UUVs in order to control the position of the entire UUV fleet (i.e., formation control) is a challenge. One approach is to control a single UUV (the Leader) that the rest of the UUVs (the Followers) would align in a pre-determined formation. The key to this approach is a cost-efficient sensor communication system between the Leader and each of the Followers. This communication system would allow for a larger variety of UUV formations for a variety of underwater tasks.

Most studies on inter-communication between UUVs have concentrated on acoustic communication, which has noted performance over long distances. However, the required hardware is costly and requires significant payload considerations in UUV platform design. A cost-effective alternative is optical communication, which can use either existing hardware (e.g., light sources as beacons) or additional hardware (e.g., commercial off the shelf (COTS) components) at low cost.

Modern spacecraft and aircraft currently use optical communication for navigation, docking and data transfer. The challenge of underwater optical communication, however, is that water scatters and absorbs light significantly greater than it would in air. As a result, the communication ranges under water tend to be much shorter, in addition, water as a medium is not homogeneous and is constantly changing. Thus, it is difficult to predict the varying optical properties of the water (e.g., diffuse attenuation coefficient and scattering) during UUV operation.

One aspect of the present invention is an optical communication instrumentation system for leader-follower formations between UUVs. In certain embodiments, the UUVs are Remotely Operated Vehicles (ROVs). In certain embodiments, the system focuses on the characterization and modeling of a 1-dimensional and/or 3-dimensional light field produced from a light source mounted on a Leader UUV. Based on the light field measurements, a prototype optical detector array for the follower UUV was developed. In addition, communication algorithms to monitor the UUV's motion were developed and evaluated. These tests were conducted using both numerically simulated software and through physical underwater experiments.

Applicants' own work included the development of a design for controlling distance detection of UUVs using optical sensor feedback in a Leader-Follower formation. The distance detection algorithms detected translational motion above water utilizing a beam of light for guidance. The light field of the beam was modeled using a Gaussian function as a first-order approximation. This light field model was integrated into non-linear UUV equations of motion for simulation to regulate the distance between the leader and the follower vehicles to a specified reference value. A prototype design of a photodetector array consisting of photodiodes was constructed and tested above water. However, before an array was mounted on the bow of the follower UUV, a better understanding of the underwater light was needed. The proposed system was based on detecting the relative light intensity changes on the photodiodes in the array.

There are several possible geometric shapes for use as optical detector arrays. The two most common array designs in literature are planar and curved. Each design has its own benefits. A curved array (FIG. 1A) requires less optical elements and aberrations are reduced. A planar-array (FIG. 1B(1)) can maximize the clarity of its signal (against existing measurement noise) between all its elements. Currently, the extent of research of optical communication for UUVs is very limited and has focused mainly on planar arrays as detector units for Autonomous Underwater Vehicles (AUVs). These studies include an estimation of AUV orientation with respect to a beacon by using a photodiode array and distance measurement between two UUVs. In addition to array design for communication between UUVs, other studies have investigated optical communications for docking operations, where AUVs are able to transmit their collected data and recharge their batteries by docking with an underwater station. This capability eliminates the need for human interruption during these tasks and significantly reduces mission time and costs.

One example used for docking operations was the use of a single detector (quadrant photodiode) in a 2×2 detector array, which was mounted on an AUV and used to detect translational motion of the AUV with respect to an external light source. The optical communication methods mentioned above were able to measure only one to three degrees of freedom (DOF) and only in pure translation and not rotation. However, UUVs maneuver in six DOF (three in translation and three in rotation). Therefore, the design of an optical detector array of the present invention is crucial for motion detection in all six DOF.

In certain embodiments of the present invention the characterization of the optical components define: 1) the geometrical shape of the optical detector array, 2) the minimum number of optical elements required to uniquely determine pose (position and orientation) feedback, and 3) the spectral characteristics (e.g., the wavelength band of the light source, the optical detectors, and the like).

In certain embodiments of the present inventions, the curved array was able to detect motion much more effectively than the planar array. The curved, array was more sensitive to the light field input, resulting in improved translational and rotational motion distinctions over that of the planar array. Furthermore, changes in positional and rotational shifts can be detected by an array consisting of a minimum of 5×5 optical elements.

In one embodiment of the present invention, a curved 5×5 optical array was used for optical communication system for UUVs. In addition to the physical characteristics of the detector, the spectral characteristics of the light source-optical detector pair is also crucial and should be identified properly. In certain embodiments, the system showed that maximum light penetration occurred between the wavelength band of 500-550 nm. In certain embodiments, a green light source (bandwidth between 500-500 nm) and a detector with peak responsivity within 500-550 nm was used. Preliminary evaluation of the communication algorithms based on simulator outputs showed good performance in the detection of translational and rotational motion of a leader UUV.

In certain embodiments, measurements and calibration of a light field via an optical detector array mounted on a follower ROV was accomplished. Follower ROV dynamic positioning algorithms based upon the acquired light field calibration are also used in certain embodiments of the present invention. In certain embodiments, look-up tables are derived from positional and rotational offset measurements between the light source and the detector array. These look-up tables are then used to develop dynamic positioning (DP) algorithms for a multiple ROV system using advanced control techniques. DP algorithms are developed using numerical simulation software. In certain embodiments, multiple ROVs are equipped with the developed optical communication system and tested to validate the performance of the optical based DP.

The dynamic positioning of UUVs of the present invention use optical feedback to maneuver multiple UUVs in precisely controlled formation. The optical instrumentation system of the present invention is also applicable to static operations such as UUV docking. The system of the present invention will significantly decrease underwater mission time and costs without risking the safety of human divers.

UUVs can be classified into two groups; 1) remotely operated vehicles (ROVs) and 2) autonomous underwater vehicles (AUVs). ROVs differ from AUVs because they are remotely operated and they require an umbilical cable from a surface vessel in order to provide power and to send and receive communication signals (e.g., video and control signals) between the ROV pilot and the ROV itself. On the contrary, AUVs are powered by onboard batteries and do not need human interaction while operating. AUVs have predefined trajectories for their tasks. As a result, AUVs are more affordable to operate than ROVs.

Some applications that employ AUVs involve collecting data in underwater environments using onboard sensors. These applications can be performed in a quicker and more efficient fashion if more than one AUV is used. To make this happen, it is imperative that the AUVs communicate with each other. In addition, these vehicles may be required to maintain a specific formation such as leader-follower configuration in which one of the vehicles is assigned as a leader and the other vehicles track its path.

In certain embodiments of the present invention, a ROV is followed with one or more AUVs in leader-follower formation by utilizing optical sensors for inter-vehicle communications. Research in leader-follower formation to date has focused almost exclusively on using acoustics for communications, but studies have shown that underwater communication with acoustics has its constraints like transmission delays, multi-path fading, directional and bandwidth limitations due to the harsh ocean environment, and the like. In addition to tracking a leader robot using optical sensors, the system of the present invention will utilize several trajectory control algorithms on the follower robot (AUV). In certain embodiments of the present invention, an AUV is followed with one or more AUVs in leader-follower formation by utilizing optical sensors for inter-vehicle communications.

In certain embodiments, a ROV may be converted to an AUV by adding an onboard power supply and adjusting for the power distribution to the onboard computers and sensors. The sensors for communication between the leader and follower vehicles are then mounted and tested. In Applicants' initial studies, a ROV was commanded via a remote controller by an operator on the surface. The ROV was elected as a leader while the AUV was the follower for testing. The ROV, which was powered from the surface via umbilical cable had a light emitter at its crest while the AUV possessed an electro-optical optical sensor located at its bow to detect the light. The photodiode on the AUV had 4 equally diced quadrants and was able to tell in which part the light was concentrated, thus the location of the leader was detected. After the AUV detected the light, several trajectory control algorithms on the AUV were tested in order to determine the optimal tracking algorithm.

It is known that light is attenuated underwater over long distances. However it has been shown that data acquisition using optical sensors can be accomplished at 10-15 meters for very turbid water and 20-28 meters in clearer water. Previous studies have shown guidance of unmanned underwater vehicles that is roughly analogous to that which is employed by a heat-seeking air-to-air missile when locked onto a target. In that case the target was a light emitter which was located at an underwater dock. When the light propagated in the absorbing, scattering medium such as seawater and it was subsequently imaged by a lens located at a distance the photons emitted by the source experienced four general outcomes: some were absorbed by the medium, others were scattered outside of the field-of-view of the detector, others were scattered into the detector's field-of-view and a few photons remained unscattered. The studies found that light in the first two categories never reached the tracker and represented attenuation, which was overcome using a brighter beacon. Scattered light within the field-of-view was imaged almost equally into each of four quadrants of a photo detector located near the focal plane of an objective lens.

Underwater light is attenuated due to the optical characteristics of the water, which are constantly changing and are not uniformly distributed. As a result, applying distance detection algorithms underwater adds complexity and reduces operational ranges. In certain embodiment's, the operation distance between the UUVs was limited to a range between 4.5 to 8.5 m for best performance.

Figure 1C:
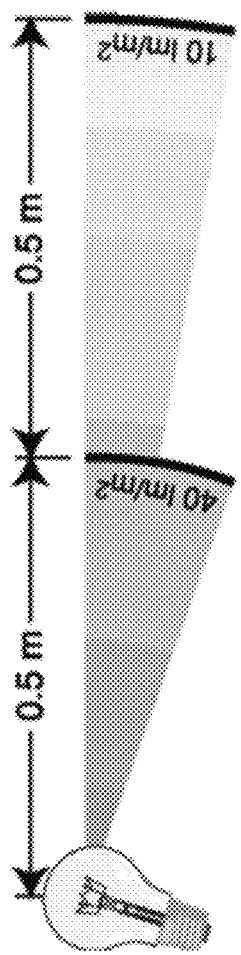
FIG. 1C graphically represents the inverse square law as it relates to ocean optics.
Figure 1D:
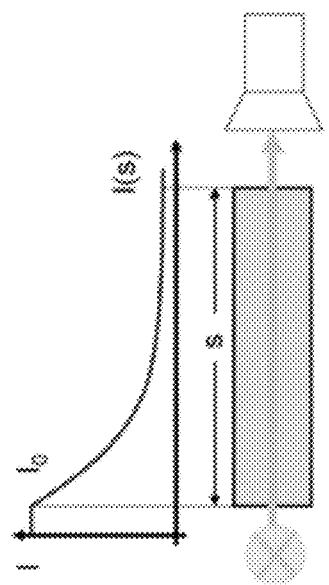
FIG. 1D graphically represents the Beer-Lambert law as it relates to ocean optics.

In certain embodiments, optical communication was based on the relative intensity measured between the detectors within the photo-detector array mounted on the follower ROV. The beam pattern produced by the light source was noted. The intensity of light underwater follows two basic optics theories, the inverse square law and the Beer-Lambert law. See, for example, FIG. 1C and FIG. 1D.

In certain embodiments, the light field emitted from a light source can be modeled with different mathematical functions. In addition, there are a variety of light sources that can be used underwater that differ in their spectral irradiance (e.g., halogen, tungsten, and metal-halide, and the like). The spectral characteristics of the light source affect the illumination range, detector type and the detection algorithms. Just as the light sources do. The photodetectors also have a spectral width in which their sensitivity is at a maximum value. In certain embodiments, determining the spectral characteristics of the light source, enable selection of the detector and filters for the photodetector array.

It is assumed that the beam pattern can be modeled using a Gaussian function, particularly for a single point light source. The Gaussian model used in this study can be represented as follows:

$$I(\theta) = A^* \exp(-B^* \theta^2) \quad (1)$$

In Equation 1, I is the intensity at a polar angle, $\theta$, where the origin of the coordinate system is centered around the beam direction of the light source. A and B are constants that describe the Gaussian amplitude and width respectively.

According to the inverse square law, the intensity of the light is inversely proportional to the inverse square of the distance:

$$I = S/4\pi r^2 \quad (2)$$

where I is the intensity at r distance away from the source and S is the light field intensity at the surface of the sphere. Thus, the ratio of the light intensities at two different locations at the same axis can be expressed as:

$$I_1/I_2 = (S/4\pi r_1^2)/(S/4\pi r_2^2) = r_1^2/r_2^2 \quad (3)$$

The light field S generated by a light source is assumed to show uniform illumination characteristics in all directions. In addition, the light intensity is such that the light source is assumed to be a point source and that its intensity is not absorbed by the medium.

It should also be noted that although the inverse square law is the dominant concept in the development of control algorithms of the present invention, this is not the only dominant optical mechanism that affects the light passing in water. As the light travels through water, its rays get absorbed by the medium according to the Beer-Lambert law. Beer-Lambert law states that radiance at an optical path length, l, in a medium decreases exponentially depending on the optical length, l, the angle of incidence, $\theta$, and the attenuation coefficient, K. Beer-Lambert law describes the light absorption in a medium under the assumption that an absorbing, source-free medium is homogeneous and scattering is not significant. When the light travels through a medium, its energy is absorbed exponentially $$L(\zeta,\xi) = L(0,\xi) \exp(-\zeta/\mu) \quad (4)$$

where L denotes the radiance, $\zeta$ the optical depth, $\xi$ the direction vector, and $\mu$ denotes the light distribution as a function of angle such that:

$$\mu = \cos\theta \quad (5)$$

defining a quantity l, (i.e., the optical path length in direction $\mu$), $$dl = d\zeta/\mu = K(z)dz/\mu \quad (6)$$

where K(z) is the total beam attenuation coefficient and dz is the geometric depth. The amount of attenuation depends on the distance z from the light source and the attenuation coefficient K. In these preliminary studies, the experimental setup was built such that the incidence angle $\theta$ was zero.

$$L(\zeta,\xi) = L(0,\xi) \exp(K(z)dz) \quad (7)$$

were L denotes the radiance and $\xi$ is the directional vector. The diffuse attenuation factor in the Applicants' preliminary study was 0.0938 m$^{-1}$. Experimental, work was performed in order to evaluate proposed hardware designs, which were based on ocean optics and the hardware restrictions liar the prototype ROV system. The experiments included beam diagnostics, spectral analysis and intensity measurements from several light sources.

Figure 2A:
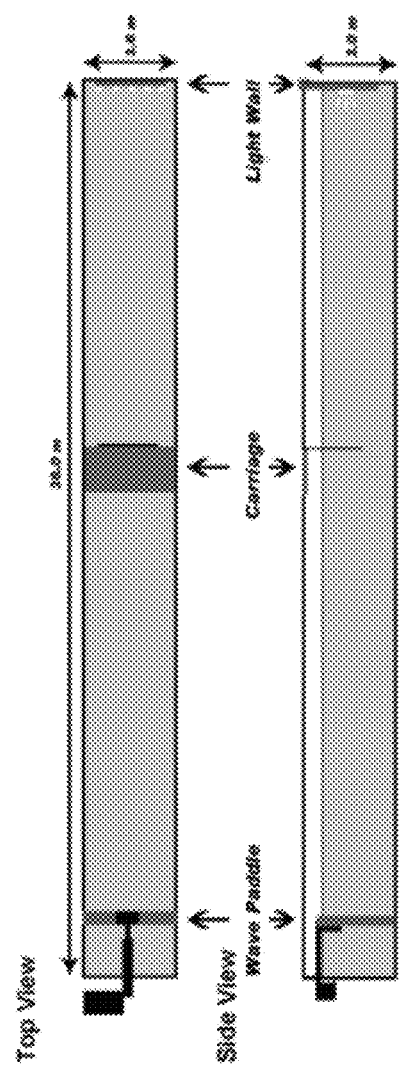
FIG. 2A is a schematic of an experimental set up for one embodiment the present invention.
Figure 2B:
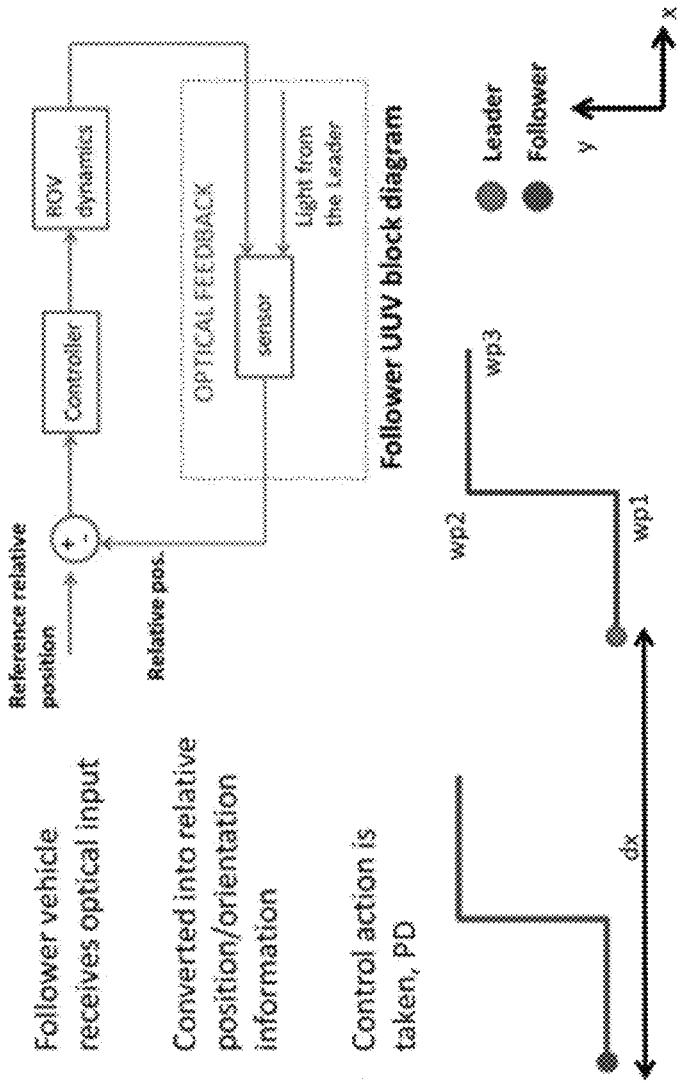
FIG. 2B represents the modeling and control of one embodiment of the system of unmanned underwater vehicles of the present invention.

A light source was mounted on a rigid frame to the wall in a tow tank and a light detector was placed underwater connected to a tow carriage. See, for example, FIG. 2A. To characterize the interaction between the light source and the light array a 50 W halogen lamp powered by 12 V power source was used. For the detector unit, a spectrometer (by Ocean Optics Jaz) was used to characterize the underwater light field. These empirical, measurements were used to adjust the detection algorithms and were also used in the design of a photo-detector array. The light source in the tank simulated a light source that was mounted on the crest of a leader ROV. The design of the photo-detector array simulated the array that would be mounted on the bow of a follower ROV. In certain embodiments, the photo-detector array design depends on the size of the ROV and the light field produced by the light source mounted on the leader ROV. In this case, the size for an optical detector module was kept at 0.4 m, which is the width dimension of the prototype ROV.

Translational experiments in 1-D and 3-D (i.e., motion along and perpendicular to the center beam of the light source) were conducted in air and in water. The goals for the 1-D experiments were to characterize the spectral properties of the water and to determine the best spectral ranges for optical communication between the ROVs. In the underwater experiment, a submerged fiber optic cable with a collimator was connected to a spectrometer and was vertically aligned based on the peak value of radiance emitted from the light source. This alignment was considered the illumination axis (z-axis). The radiance emitted from the light source through the water column was empirically measured by the spectrometer at distances ranging from 4 m to 8 m at 1 m increments. It is important to note that the distances were measured from the tow carriage to the wall of the tank and an additional 0.5 m offset distance was added in the calculation to take into account the offset mounting of the light and spectrometer with respect to the wall of the tank and the tow carriage. The spectrometer was configured to average 40 samples with an integration time of 15 milliseconds. A 2° collimator was used to restrict the field of view collected by the spectrometer and to avoid the collection of stray light rays reflecting off the tank walls or from the water surface.

The experimental setup in air was very similar, where the spectrometer was mounted on a tripod and aligned to the peak value of radiance, the illumination axis (z-axis). Because such light sources produce heat at high temperatures (up to 700° C.), the experimental setup in air required that the light source be submerged in an aquarium during operation. Similar to the underwater experiments, the same distances between the light source and the spectrometer, including the offsets, were maintained.

The 3-D translational underwater experiments utilized the same setup as that of the underwater 1-D experiments where additional radiance measurements were conducted along a normal axis (x-axis) located on a plane normal to the illumination axis (z-axis). The 3-D translational experiment maintained the same distances along the illumination axis between the light source and the spectrometer (i.e., 4 m to 8 m), where additional measurements were conducted along, the normal axis at 0.1 m increments ranging from 0 m to 1 m. As mentioned previously, it is assumed that the light source produced a beam pattern that can be modeled, using a Gaussian function. Accordingly, it was assumed that the radiance measurements along the normal axis were symmetric in all directions. The diffuse attenuation coefficient, K, was used as a parameter to calculate the decreased amount of energy from the light source to the target. The diffuse attenuation coefficient was used to determine the spectral range of the light source and determine the photodetector types that could be utilized in the array.

In certain embodiments, for successful optical communication up to ranges of 9 m, the spectral ranges should be maintained such that the diffuse attenuation coefficient values are smaller than 0.1 m-1 m. At this distance, the signal loses about half its energy. As a first-order approximation, the diffuse attenuation coefficient values were assumed constant throughout the water column. This assumption reduced the number of parameters used in the distance detection algorithms and the processing time used in future controls applications. The diffuse attenuation coefficient values were calculated for a 50 W light source.

Diffuse attenuation was calculated. Measurements taken at a specific distance in water and in air were compared in order to account for the inverse square law. The light that traveled in air also underwent diffuse attenuation but it was ignored in this case. The values suggested that the wave tank, where the experiments were conducted, contained algae and dissolved matter. The study results suggested that 500-550 nm band-pass filters in the range should be used in the detector unit to provide better performance of the distance detection algorithms.

Figure 3:
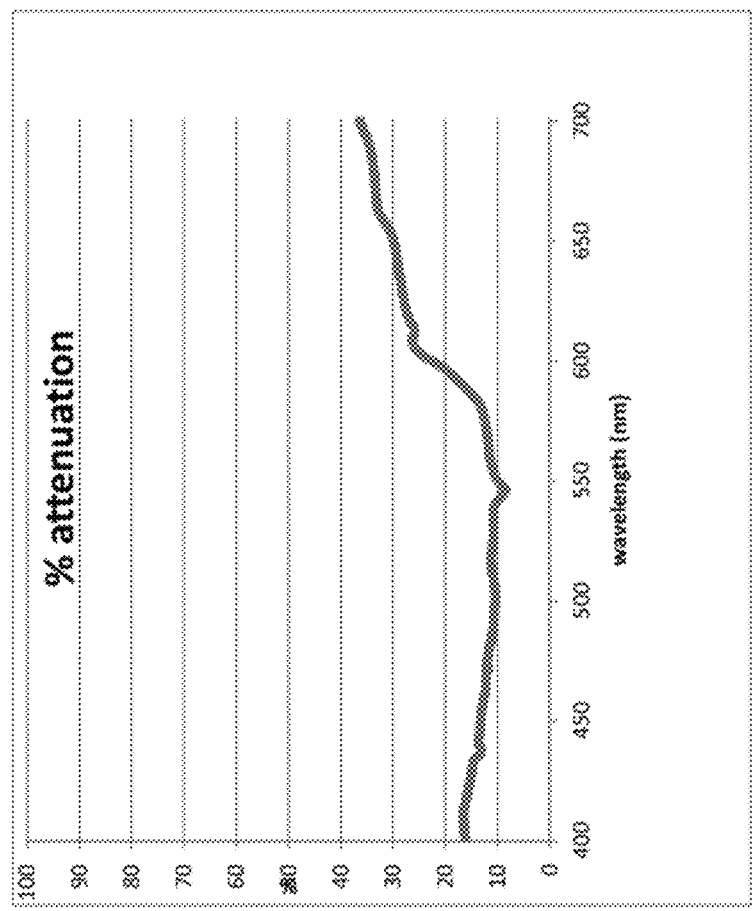
FIG. 3 shows light attenuation results for one embodiment of the present invention.

Referring to FIG. 3, it was seen that the spectral range between 500-550 nm underwent the least attenuation at any given distance. Based on the light attenuation results, the distance between the leader and the follower vehicles was calculated. The experimental results showed that the performance of the algorithms in the water tank was expected to decrease after 8.5 m. Beyond this range, the light intensity fell into the background noise level (i.e., <20%). The intensity readings were collected between 500-550 nm and averaged. The experimental values were compared with the theoretical. The measurement at 4.5 m was used as the reference measurement to normalize the intensity.

The light profile calculated from the 3-D experiments agreed with the assumption that the pattern of the light beam can be described using a 2-D Gaussian fit. See, FIG. 4. Using a 50% intensity decrease as a threshold, the effective beam radios from the center (i.e., the illumination axis) was 0.3 m. Another key finding obtained from the 3-D experiments, was the dimensions of the light detector array. It was shown that if the length of the array was kept at 0.6 m, then different light detector elements could detect the light intensity change, which is useful information for control algorithms. It should be stated that the physical characteristics of the photo-detector array such as dimensions and the spacing between the array elements strictly depend on beam divergence.

Figure 4A:
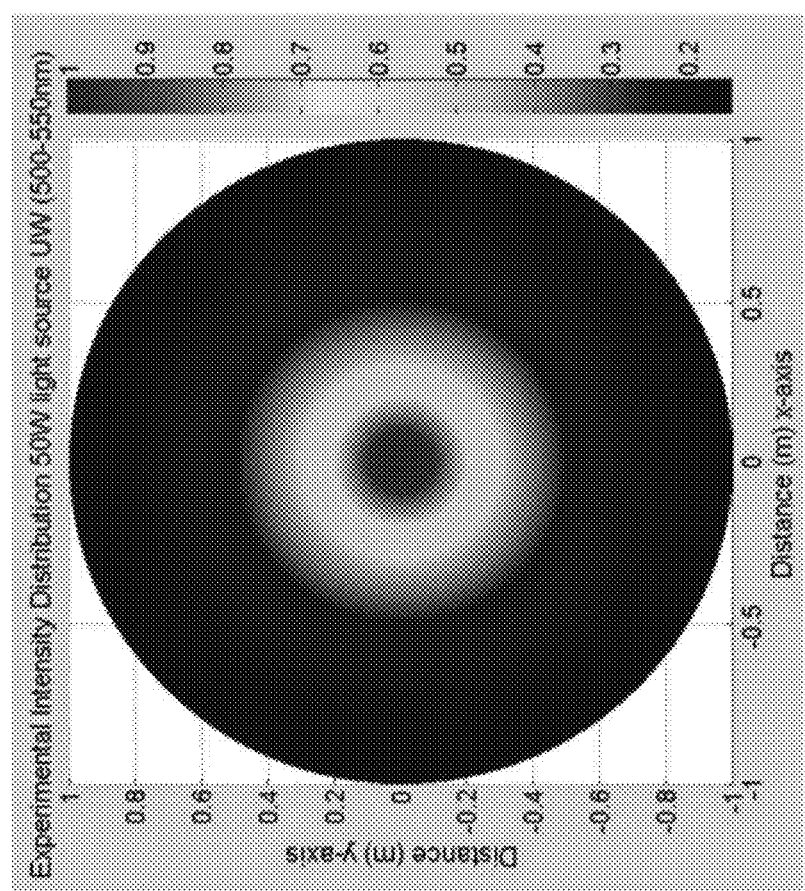
FIG. 4A is a plot of the cross section beam pattern of one embodiment of the present invention.
Figure 4B:
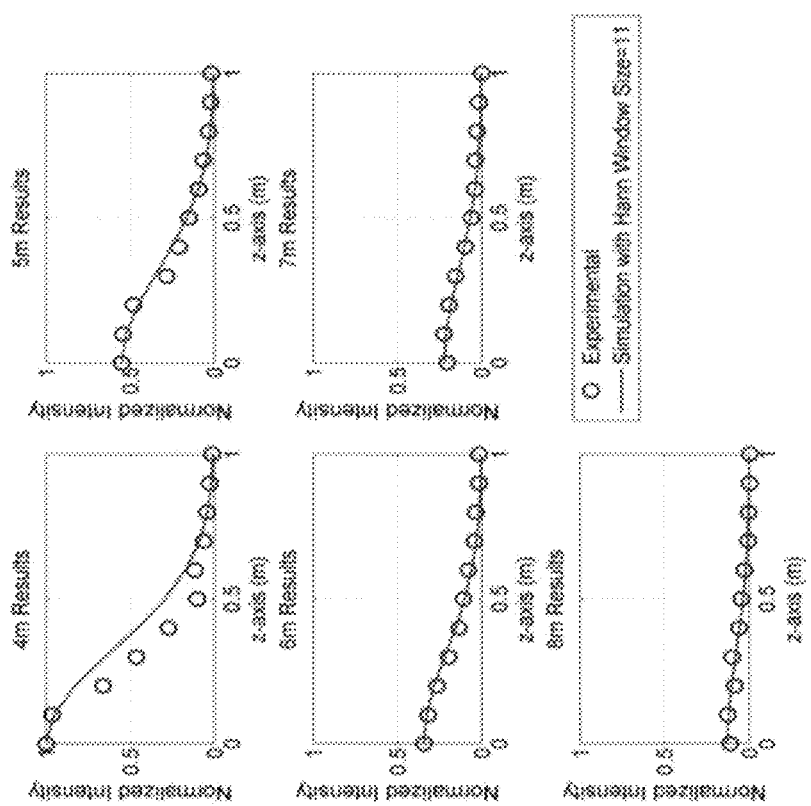
FIG. 4B shows plots for normalized intensity versus distance for certain embodiments of the present invention.

Referring to FIG. 4A, a plot of the cross-sectional beam pattern is shown. The measurements were collected from 0 to 1.0 m at x-axis and at 4.5 m at the illumination axis for 50 W light source. The measurements between 500-550 nm were averaged. FIG. 4B shows the normalized, intensity plotted against distance for certain embodiments of the present invention.

Figure 5:
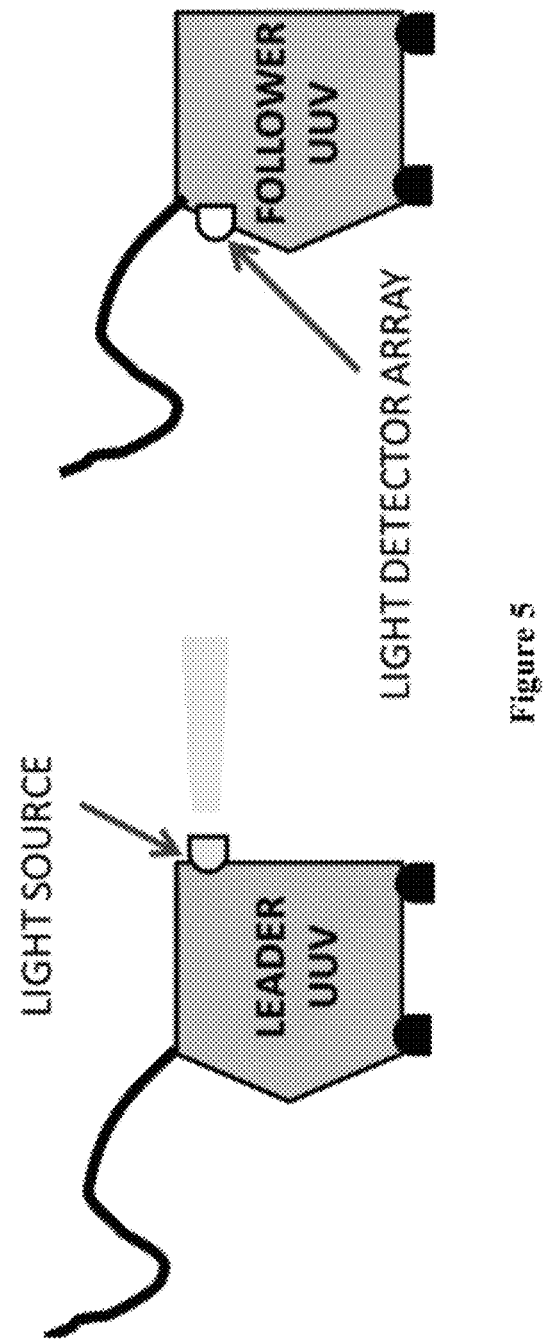
FIG. 5 shows one embodiment of the system of the present invention.

Referring to FIG. 5, one embodiment of the system of the present invention is shown. More particularly, a leader UUV and a follower UUV are shown. The leader UUV has a light source and the follower UUV has a light detector array. In certain embodiments, the UUVs are configured to maintain relative x, y, z, and ψ coordinates between the two or more UUVs using optical feedback.

Figure 6:
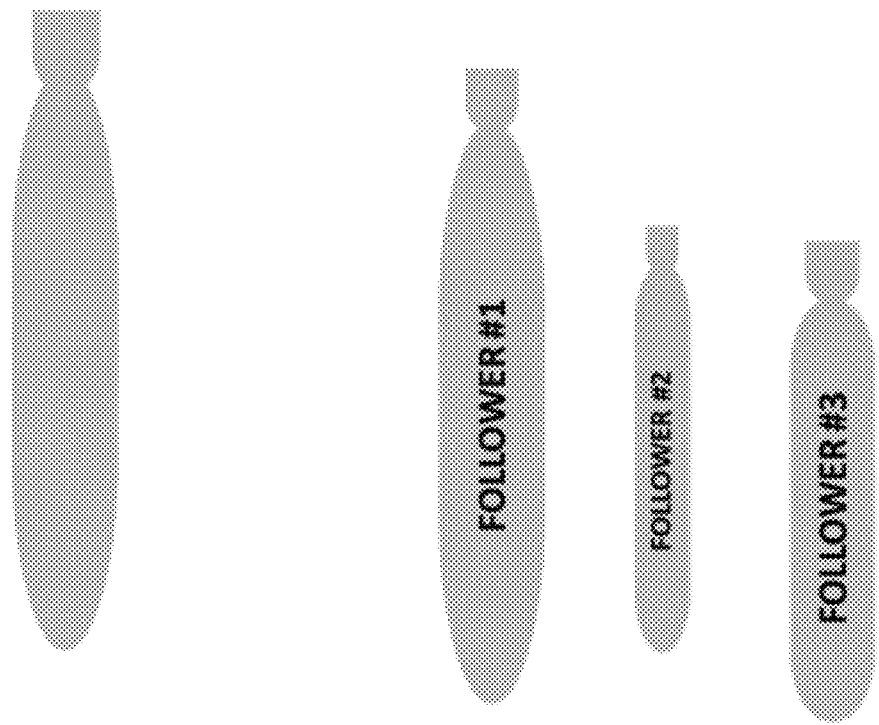
FIG. 6 shows one embodiment of the system of the present invention.
Figure 6:
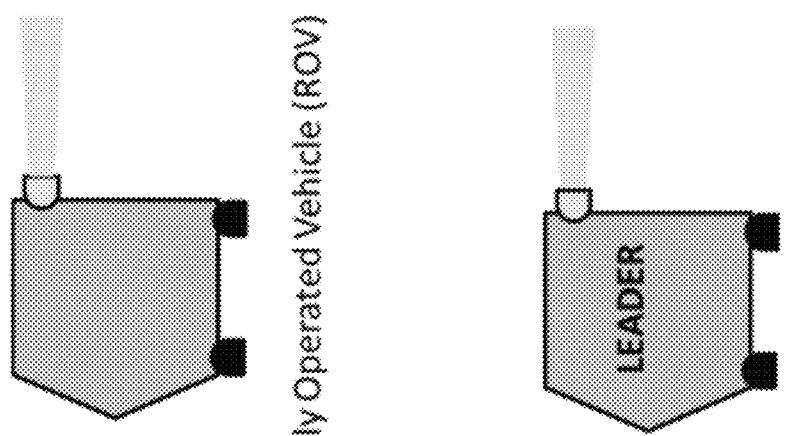

Referring to FIG. 6, one embodiment of the system of the present invention is shown. More particularly, a leader UUV and a follower UUV are shown in the top of the figure. In certain embodiments, the leader is a ROV. In certain embodiments, there are multiple follower UUVs. In certain embodiments, the leader UUV has a light source and the one or more follower UUV's has a light detector array. In certain, embodiments, the UUVs are configured to maintain relative x, y, z, and ψ coordinates between the two or more UUVs using optical feedback.

According, to the calculated diffuse attenuation, a 500-550 nm band-pass filter allows for the observation at the light field from a single source as a 2-D Gaussian beam pattern. At this spectral range, around 0.1 m-1 m, the peak power of the beam (along the z-axis) changed from 100% to 23% as the array moved away from light from 4.5 m to a distance of 8.5 m. The size of the beam pattern is a function of the divergence angle of the beam. In certain embodiments, the FWHM radius expanded from 0.3 m to 0.4 m as the array moved away from light from 4.5 m to a distance of 8.5 m. In certain embodiments, the beam divergence can be modified using reflectors and optic elements in case more acute changes in the light field are needed over a shorter distance of 0.4 m.

While gathering empirical measurements in the test tank, several error sources were identified that limited an accurate correlation between the models and its corresponding measurements. These errors included alignment errors and measurement errors underwater. Although the frame mounting all the elements was rigid and aligned, the internal alignment of the light source and of the detectors may not have been aligned perfectly along one axis. As a result, the profile measurements of light along the z-axis and the along the xy-plane might be slightly skewed. Another factor was the water turbidity. An accurate calculation of the water turbidity is important. Therefore, for more accurate distance detection algorithms, water turbidity should be taken into account as well as proper alignment.

In certain embodiments of the system of the present invention, the system can be used in other applications, such as underwater optical communication and docking. Underwater optical communication can provide rates of up to 10 Mbits over ranges of 100 m. Several studies have investigated the use of omnidirectional sources and receivers in seafloor observatories as a wireless optical communication. Another application is underwater docking by using optical sensors.

One aspect of the present invention is a system that controls the relative pose position between two or more UUVs using control algorithms and optical feedback. In certain embodiments, the leader UUV is configured to have a light source at its crest, which acts as a guiding beacon for the follower UUV that has a detector array at its bow. Pose detection algorithms are developed based on a classifier, such as the Spectral Angle Mapper (SAM), and chosen image parameters. In certain embodiments, an archive look-up table is constructed for varying combinations of 5-degree-of-freedom (DOF) motion (i.e., translation along all three coordinate axes as well as pitch and yaw rotations). In certain embodiments, leader and follower vehicles are simulated for a case in which the leader is directed to specific waypoints in a horizontal plane and the follower is required to maintain a fixed distance from the leader UUV. In certain embodiments of the present invention. Proportional-Derivative (PD) control, or the like, is applied to maintain stability of the UUVs. Preliminary results indicate that the follower UUV is able to maintain its fixed distance relative to the leader UUV to within a reasonable accuracy.

The UUVs kinematics are typically analyzed by using Newton's second law as presented here, $$\tau = M\dot{v} + C(v)v + D(v)v + g(\eta) \quad (8)$$

The linear and angular velocity vector are represented in the body coordinate reference frame $v \in \mathbb{R}^{6 \times 1}$. The UUVs mass and the hydrodynamic added mass derivatives are composed from the rigid body mass, $M_{RB}$, and the added mass matrix, $M_A$, (i.e. $M_A = M_{RB} + M_A$). The Coriolis and the centripetal forces are described as $C(v) = C_{RB}(v) + C_A(v)$, where $C_{RB}(v)$ and $C_A(v)$ are derived from $M_{RB}$ and $M_A$ matrices, respectively. The UUV is also subjected to gravitational forces and moments, $g(\eta)$, as a function position and attitude in the Earth-fixed reference frame, $\eta \in \mathbb{R}^{6 \times 1}$. Lastly, the quadratic damping force on the UUV D(r) are described by following matrix $$D(v)v = \begin{bmatrix} v^T D_1 v \\ v^T D_2 v \\ v^T D_3 v \\ v^T D_4 v \\ v^T D_5 v \\ v^T D_6 v \end{bmatrix}$$

where $D_i \in \mathbb{R}^{6 \times 6}$ is a function of water density, drag coefficient, and projected cross-sectional area. The control input vector is derived with respect to the body coordinate frame, as the control input is applied to the body. The body fixed reference frame is transformed into the Earth-fixed reference frame:

$$\dot{\eta}_1 = J_1(\eta_2)v_2 \quad (9)$$

where $\eta = [x, y, z, \phi, \theta, \psi]^T$ is composed of translation along the x, y and z axes and roll, $\phi$, pitch, $\theta$, and yaw, $\psi$, rotations defined in Earth-fixed coordinates. Here, $\eta \in \mathbb{R}^{6 \times 1}$ is the position and attitude state vector in the Earth-fixed coordinate frame, i.e. $\eta_1 \eta_2 T$, were $\eta_1 \in \mathbb{R}^{3 \times 1}$ corresponds to translational motion in the Earth-fixed reference frame and $\eta_2 = [\phi, \theta, \psi]^T$ is the vector of Euler angles (using a 3-2-1 rotation sequence) representing the vehicle attitude.

$J_1 \eta_2$ is the transformation matrix from the body fixed coordinates to Earth-fixed coordinates) and is described as $$J_1(\eta_2) = \begin{bmatrix} c\psi c\theta & -s\psi c\phi + c\psi s\theta s\phi & s\psi s\phi + c\psi c\phi s\theta \\ s\psi c\theta & c\psi c\phi + s\phi s\theta s\psi & -c\psi s\phi + s\theta s\psi c\phi \\ -s\theta & c\theta s\phi & c\theta s\phi \end{bmatrix}$$

where s(•) and c(•) represents sine and cosine functions, respectively, while $\phi$, $\theta$ and $\psi$ are the corresponding roll, pitch and yaw angles defined in Earth-fixed coordinates, respectively. As such, the corresponding attitude transformation matrix is an identity matrix such that $J_1(\eta_2) = I_{3 \times 3}$. Numerical integration results in the extraction of UUV position in the Earth-fixed coordinate frame.

In certain embodiments, under the assumption that the leader UUV has a known path a priori, the follower UUV can use information collected by a planar or other detector array as feedback to determine the leader UUV's relative pose $\eta_f = \eta_l - \eta_d$ where $\eta_f$ is the follower pose, $\eta_l$ is the leader pose determined by the follower, and $\eta_d$ is the desired relative pose, incorporating desired relative distance and attitude, between the leader and the follower UUVs. The control problem in this case can be evaluated as both a point-to point regulation problem and also as a trajectory control problem. In certain embodiments, the leader is given a reference input, i.e. step inputs, to travel to given waypoints while the follower generates its own time-varying trajectory from the leader motion. The PD control of a nonlinear square system, has been shown to be asymptotically stable using Lyapunov's Direct Method.

In certain embodiments of the present invention, the follower pose detection of the leader is based on the output image sampled by the follower's detector consisting of an array of 21×21 detector elements. Specifically, the output image is the light field emitted from the leader's beacon that intersects with the planar detector array. In certain embodiments, the control algorithms were tested using data produced from the detector array simulator developed by the Applicants. The input to the simulator is the relative pose geometry between the UUVs and the optical conditions of the medium. To extract the pose of the leader from the image, five main image parameters are used. These parameters are the Spectral Angle Mapper (SAM), the skewness of both the row and column of the resulting intensity profile, and the row and column numbers of the image pixel with the highest intensity. SAM is a measure of resemblance between a reference image and an image under test. In certain embodiments, the reference image is the output obtained from the detector array when the light source and the detector have an offset along the x-axis only with no translation/rotation. In certain embodiments, the image under test is the output when there is a specific relative pose between the leader and the follower. The SAM algorithm is given as $$\alpha = \cos^{-1}\left( \frac{\vec{U}_t - \vec{V}_t}{\|\vec{U}_t\| - \|\vec{V}_t\|} \right)$$

where $\alpha$ is the SAM angle which varies between 0° and 90° and increases when the difference between the two images increases. $U_t$ and $V_t$ are the light intensity vectors obtained by the detectors for the reference image and image under test, respectively.

The two other key image parameters are the skewness values of the horizontal slope, $Sk_x$, and the vertical slope, $Sk_y$. The key in using these parameters is that they do not require significant computational effort. This is a key advantage, as the performance of the control system can degrade with increased computational delays.

Figure 7:
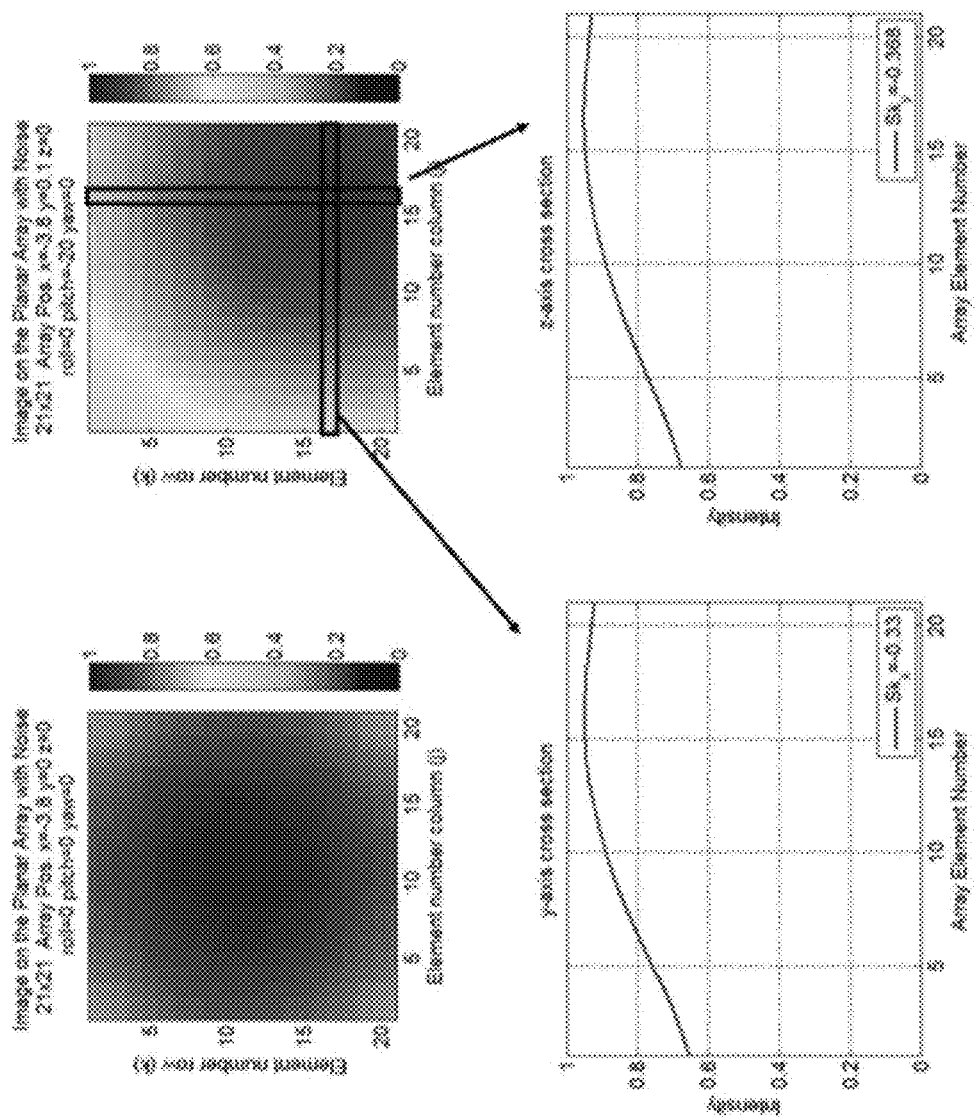
FIG. 7 shows a reference image compared to a detected image for one embodiment of the system of the present invention.

Based on the location of the pixel with the maximum intensity, the horizontal and vertical gradients of the image can be calculated. The use of the gradient of the intensities, rather than the intensity profile itself, is advantageous as the slope provides both directionality and asymmetry information. As an example, a reference image and sample detected image with the resulting horizontal and vertical profiles (showing the respective gradients in each direction) are provided in FIG. 7. Referring to FIG. 7, a reference image and detected image are shown. Reference image (top left), Detected image (top right), y-axis intensity profile (bottom left), z-axis intensity profile (bottom right).

In certain embodiments of the present invention, varying geometries were simulated with a numerical simulator. For translation motion, e.g., y and z-axis motions, the detector array was moved from −0.3 m to 0.3 m at 0.03 m increments. For rotational motion, e.g., pitch and yaw motion, the follower was rotated from −30° to 30° at 3° increments. The results from the simulations for each combination of motions were stored in a consolidated data base, in the form of a look up table. The table consisted of the pose of the light source, i.e. x, y, z, $\psi$ (yaw) and $\theta$ (pitch), the corresponding skewness values for the images, i.e., $Sk_x$ and $Sk_y$, $\alpha$ (SAM angle), and the row and column number of the pixel with the highest intensity (See, for example, FIG. 8).

Referring to FIG. 8, the first four columns indicate the inputs to the simulator of the present invention (e.g., relative position between the light source and detector and the central pixel of the detector array). Columns five to column nine indicate the 5 chosen optical parameters describing the detected output. In certain embodiments, the follower UUV detector array samples the incoming light field and the real-time measurements are compared to values contained in the aforementioned database. After which, the leader UUV's relative pose is obtained. The leader UUV's pose parameters y, z, $\theta$ and $\psi$ are estimated using the compiled database. The x-axis coordinate is estimated using the previously estimated y, z, $\theta$ and $\psi$.

In certain embodiments of the present invention, the pose detection algorithm starts with the determination of the pixel (e.g., detector array element) with the greatest light intensity. Then, the poses that result in the same maximum pixel intensity location are extracted from the database. These poses are referred to as "candidate poses." By comparing the intensity profile of the neighboring pixels with the pixel with the greatest intensity, any rotational (e.g., pitch and yaw) motion can be detected. Then, the skewness values ($Sk_x$ and $Sk_y$) and SAM angle are subtracted from the candidate pose parameters to obtain a "difference table." The result is a numerical cost function, $P_i$, comprised of the differences of the chosen optical parameters as a weighted sum:

$$P_i = c_1|Sk_x - Sk_{xi}| + c_2|Sk_y - SK_{yi}| + c_3|SAM - SAM_i|$$

where, $P_i$, $Sk_{xi}$, $Sk_{yi}$ and $SAM_i$ represent the penalty, skewness and SAM angle values, respectively, for the candidate pose, i. The parameters $c_1$, $c_2$, and $c_3$ denote the respective weighting factors for row and column skewness and SAM angle. Among the chosen candidate poses, the candidate with the lowest penalty score is chosen as the pose estimate.

In certain embodiments, the x-coordinate of the leader vehicle is estimated separately in a two-step procedure. In the first step, a rough estimate of the x-position is obtained based upon the total intensity of all of the detector array elements. In certain embodiments, a calibration procedure is performed by evaluating the intensities at x coordinates from 4 m to 8 m at 1 m increments. The sum of the intensities at the detector elements are calculated when the leader and the follower only have x-offsets between them. The resultant calibration curve provides the first x-coordinate estimation as follows:

$$x_{est1} = 10^{\frac{\log_{10}\left(\frac{I_{total}}{12293}\right)}{-2.476}}$$

In the second step, the x-coordinate estimate from the first step is corrected by using the estimated relative y, z, $\theta$ (pitch) and $\psi$ (yaw) values as follows $$x_{est} = x_{est1} - \sqrt{y_{est}^2 + z_{est}^2} - l\sin(\theta)\cos(\psi)$$

In certain embodiments, the estimated 5-DOF parameters are then used as feedback to the control system in order to perform the appropriate action to control the movement of UUVs.

A preliminary analytical study was performed on a leader follower UUV system. Both the leader and the follower vehicles were assumed to be identical with the same mass and inertia and both used the same PID control parameters (i.e., P=50 and D=8). A generic PID controller was used, but other controllers know to those of skill in the art can be used. In addition, the leader UUV was given two reference points, $R_1$ and $R_2$ while the follower was required to maintain, a relative x-offset of 4 m from the leader and to maintain y-axis alignment with the leader UUV (See, for example, FIG. 9). The leader was given step input changes, directed to travel to the specified waypoints. Initially, the leader UUV was commanded to go from its initial position of (4, 0) to $R_1$ (4, 0.5).

The control goal for the follower UUV was to follow the leader from 4 m behind in x-axis direction while maintaining, the same y-axis coordinate. The trajectories generated by the detection algorithms were smoothed using a Kalman filter as the distance detection algorithm resulted in a finite resolution, i.e. 0.03 m in y-z axes motion detection.

Figure 10:
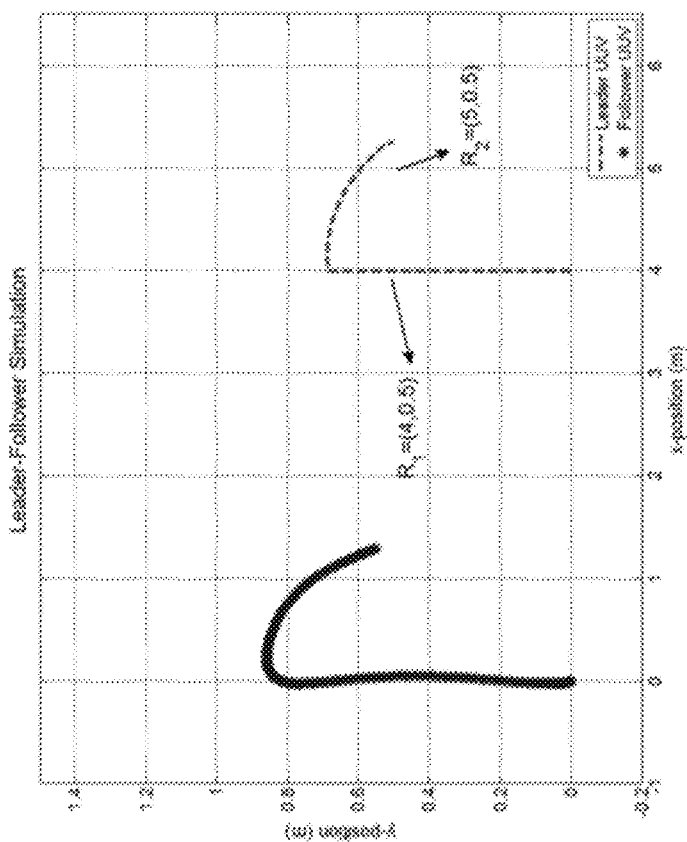
FIG. 10 shows a plot of leader follower behavior for one embodiment of the system of the present invention.

As shown in FIG. 10, the performance results of the leader-follower UUV system (i.e. detection algorithm and control design) demonstrate that the follower UUV maintained the desired fixed distance from the leader with acceptable accuracy. Referring to FIG. 10, waypoints $R_1$ and $R_2$, the leader (dashed line) and the follower motions (solid line) are shown in the xy-plane. It is observed, that the leader UUV does not deviate in the x direction, but has an overshoot in the y-direction at the first waypoint. At the second waypoint, i.e. $R_2$, the leader's PID controller manages to eliminate the error in the y-direction but results in an overshoot in x-direction.

Figure 11:
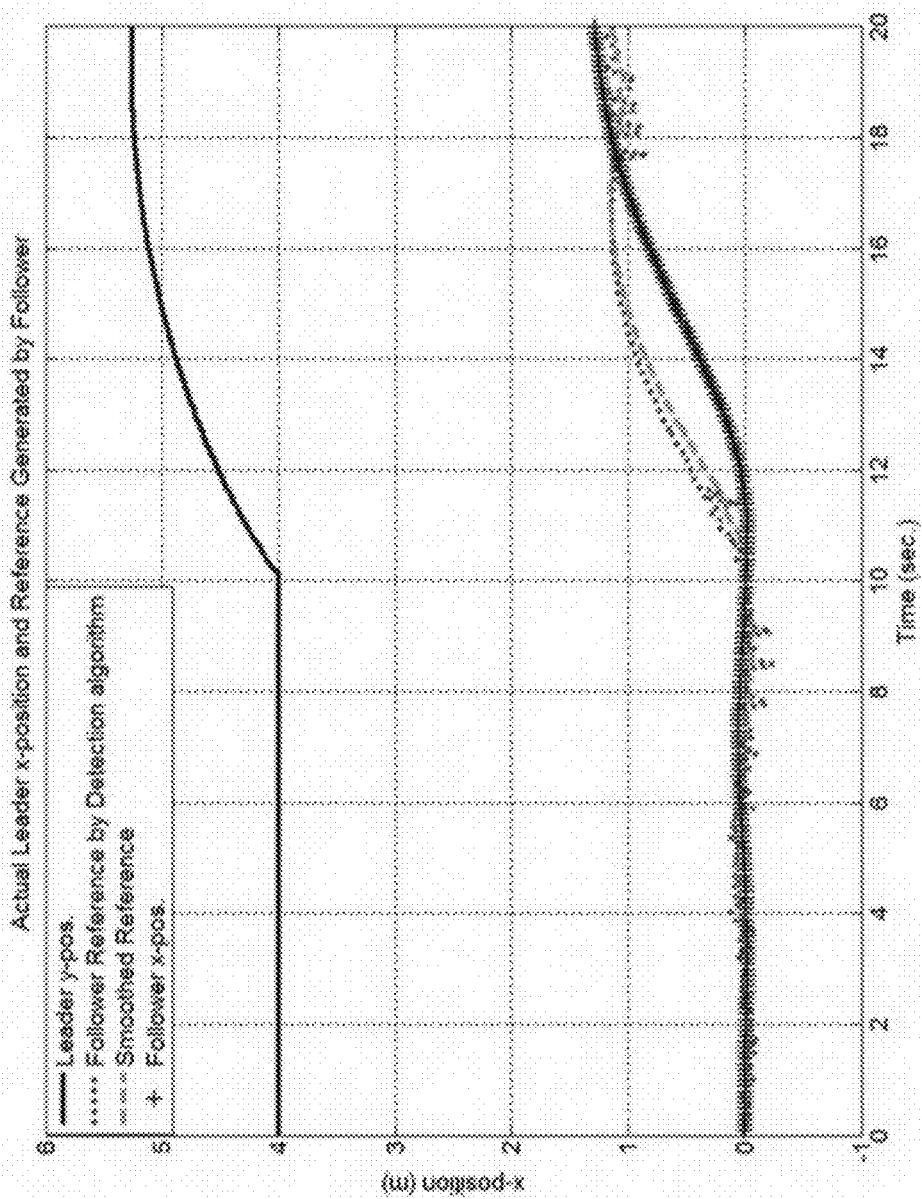
FIG. 11 shows a plot of leader follower behavior for one embodiment of the system of the present invention.
Figure 12:
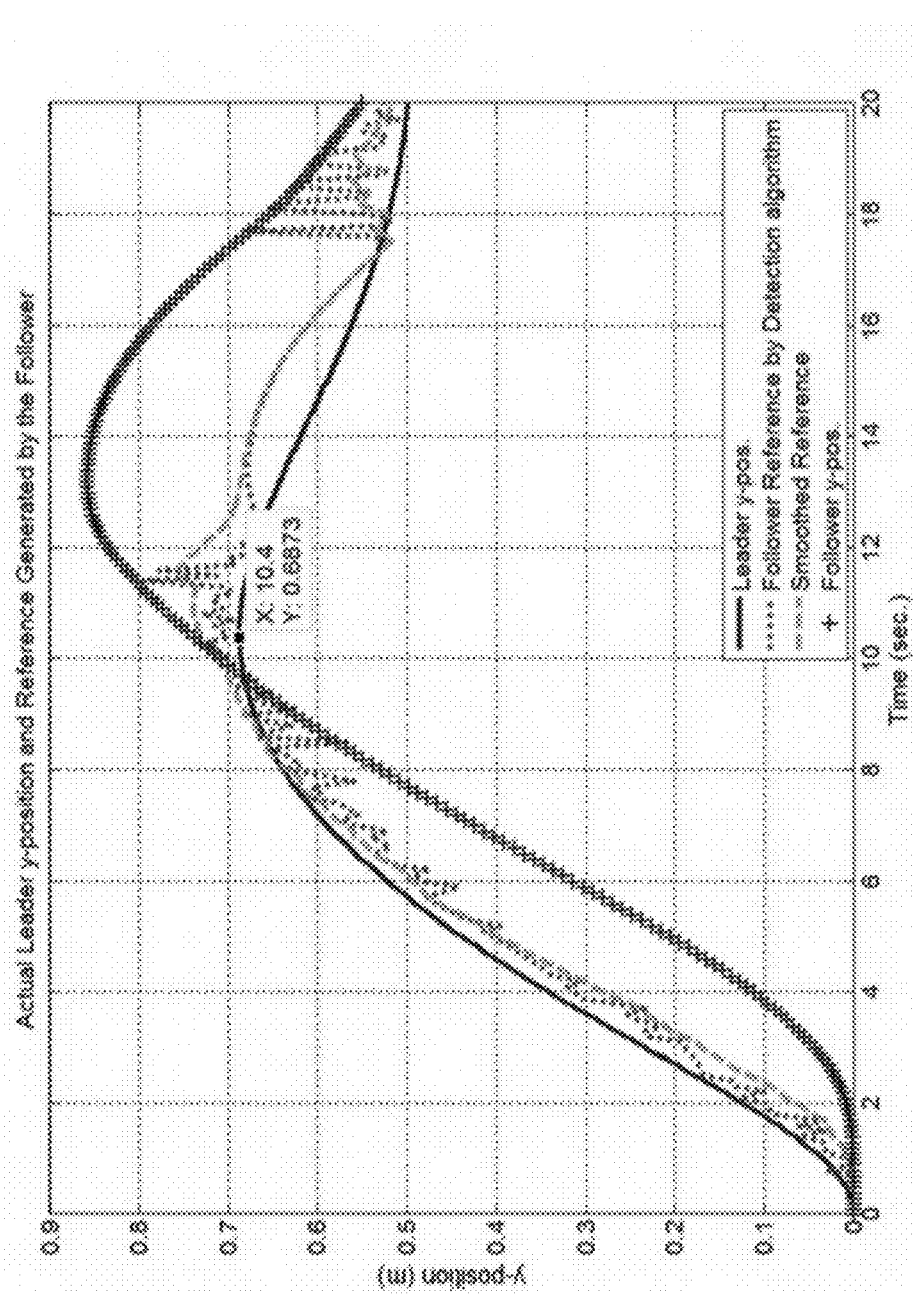
FIG. 12 shows a plot of leader follower behavior for one embodiment the system of the present invention.

Contrary to the leader UUV, the follower UUV generates its own desired time-varying trajectory by observing and estimating the motion of the leader UUV. The reference trajectory generated by the follower UUV and smoothed by the Kalman filter resulted in a smoother trajectory than the trajectories generated by the detection algorithm, especially in y-axis. FIG. 11 and FIG. 12 show the actual leader and follower motions in the x and y-axes, respectively. Overall, the leader UUV completed its task with negligible steady-state error in the y-axis and 0.26 m steady-state error in the x-axis. The follower UUV managed to keep its distance with the leader UUV to 3.97 m in the x-axis direction and 0.05 m in the y-axis direction. The errors associated with the follower in the two axes were 0.03 m and 0.05 m, respectively, and were within the tolerance of the pre-defined control goals.

Referring to FIG. 11, the UUV time-varying x-axis coordinates are shown. The leader UUV's x axis motion (solid line), the follower reference trajectory generated by the detection algorithm results (dots), and a smoothed trajectory (dashed line) are shown.

Referring to FIG. 12, the leader UUV's y-axis motion are shown. The leader UUV's x-axis motion (solid line), the follower reference trajectory generated by the detection algorithm results (dots), and a smoothed trajectory (dashed line) are shown.

In certain embodiments of the system of the present invention, the follower UUV is able to detect the motion of the leader UUV based on five parameters ($Sk_x$, $Sk_y$, the row and column elements corresponding to a greatest light intensity, and the SAM angle) extracted from the output imagery of the detector array. In certain embodiments, a database is constructed to account for varying combinations of relative positions and orientations of the leader UUV with respect to the follower UUV. Based on a pre-defined course of the leader UUV, virtual real-time distance detection algorithms are applied using the intensity measurements from the detector array and the database look up tables.

In certain embodiments, the leader motions are calculated based on row and column elements in the imagery that are taken as pose candidates. In certain embodiments, the final pose for the leader position is calculated based on a calculated cost function that incorporates the differences of the skewness of the beam in the imagery and corresponding; SAM angles.

Preliminary results from simulations that included the leader UUV following two reference waypoints (as step inputs) demonstrate that the control system has good performance. The leader UUV control system managed to maintain the final control goal to within 5% overshoot in the x-axis direction and no overshoot in the y-axis direction. The follower UUV generated its trajectory based on the feedback received from the detection algorithm and used the Kalman filter to smooth the trajectory. The follower UUV was able to complete its control goal to within an accuracy of 0.03 m in the x-axis direction and 0.05 m in the y-axis direction. The follower UUV's motion accuracy was dependent on the accuracy of its detection algorithm.

Because the follower UUV generates its own time-varying trajectory, it is vital that the reference trajectory is smooth. To compensate for this time-varying trajectory, a Kalman filter is applied. Although the follower UUV performed well in maintaining its control goals (e.g., traveling to a waypoint), better controllers could be implemented for increased tracking performance. In certain embodiments, a more advanced detection algorithm is used which is able to provide better motion detection capability. In certain embodiments, cross-talk during the simulations, e.g. detection of yaw and pitch motion when the leader's trajectory did not include any rotation, is minimized. In certain embodiments, the implemented control algorithm uses sophisticated controllers specifically designed for nonlinear systems.

In certain embodiments of the present invention, various optical detector arrays are designed for the purpose of determining and distinguishing relative 5 degree-of-freedom (DOF) motion between UUVs: 3-DOT translation and 2-DOF rotation (pitch and yaw). In certain embodiments, a numerically based simulator is used to evaluate varying detector array designs. In certain embodiments, the simulator includes a single light source as a guiding beacon for a variety of UUV motion types. The output images of the light field intersecting the detector array are calculated based on detector hardware characteristics, the optical properties of water, expected noise sources, and the like. In certain embodiments, the simulator is used to compare and evaluate the performance of planar, curved, or other shaped detector arrays (of varying sizes). In certain embodiments, output images are validated using in situ measurements conducted underwater. Results show that the optical detector array is able to distinguish relative 5-DOF motion with respect to the simulator light source. Furthermore, tests confirm that the proposed detector array design is able to distinguish positional changes of 0.2 m and rotational changes of 10° within 4 m-8 m range along the x-axis based on given output images.

Planar and curved array designs for underwater optical detection between UUVs or between a UUV and a docking station are compared. The comparison between the two types of arrays is conducted using a simulator that models a single-beam light field pattern for a variety of motion types (i.e., 3-DOF translation and 2-DOF rotation). In addition, the number of elements in the array and the possible noise sources from experimental hardware and the environment are also taken into account. The results from the simulator are validated using in situ measurements conducted in underwater facilities. These results are used to design an optical detector unit for UUVs using translational and rotational detection and control algorithms.

The performance criteria tier an optical detector array design suitable for underwater communication between UUVs can be judged by two characteristics. The first is the ability of the detector array to provide a unique signature, that is, a sampled image that represents a given location and orientation of a UUV with respect to a transmitter (e.g., light source). The second characteristic is the minimum number of required optical detector components. A smaller number would simplify the hardware design and reduce processing time. A unique signature, an image footprint from the optical detectors, enables a UUV to receive the necessary feedback to help the on-board control system determine appropriate control commands to maintain a specified/desired orientation with respect to and distance from a beacon (or any other object of interest).

The idea behind an optical detector array is such that as this array, which is mounted on a UUV, comes in contact with a guiding beam, or the like. The light field is sampled and a signature of the light beam is obtained. In certain embodiments, the light source represents a guide that is mounted on a leader UUV or on a docking station. In certain embodiments, a single light source is used as the guiding beam for the detector array. The light field generated from the light source is approximated as a Gaussian beam at a given solid angle. For large arrays (i.e., arrays with several individual detectors), the light signature can be further represented as an image.

The design considerations for an optical detector array can be categorized as environmental and hardware-related. In certain embodiments, the primary hardware for such a module consists of optoelectronic array components (e.g., photodiodes). These components are framed in a specific configuration and are mounted to an appropriate area on a UUV. A planar array is an array of optical detectors that are mounted on a flat, 2-dimensional frame. Although the optical detectors can be placed in any configuration, to traditional equidistant design is assumed for the sake of simplicity. The detector, furthermore, is assumed to be square, having an equal number of vertical and horizontal elements (See, for example, FIG. 1B). The planar array simplifies the design and the resulting light signature, which is a cross-sectional (and possibly rotated) view of and within the light field.

A curved array is an array of optical detectors that are mounted on either a spherical or parabolic frame. The geometry of the frame (curvature and oblateness) provides a larger range of incidence angles between the detectors and the light field, in this study, all elements of the curved array are equidistant in a plane projection and located at a fixed distance from the geometric center of the frame (See, for example, FIG. 1A).

In certain embodiments, the light source is assumed to be a point source with peak radiance $L_o$ (r=0, η=0, Δλ) [W/m$^2$·sr·nm] for a given detector with a fixed aperture area. Here, r is the distance from the light source to the optical element, η is the angle between the light ray reaching a detector and the optical axis, and Δλ is the spectral range as measured by the detector (See, for example, FIG. 1B(2)). The beam pattern from the light source is defined as a symmetric two-dimensional Gaussian beam pattern:

$$L_0(0, \eta, \Delta\lambda) = L_0(0, 0, \Delta\lambda) \cdot e^{\left(\frac{\eta_2}{2\sigma^2}\right)}$$

where σ is the standard deviation of the light beam.

Referring, to FIG. 1B(2), the optical detector array and relevant optical angles are shown. More particularly, the solid line represents the light ray reaching a detector, the dashed line represents the optical axis and the dotted line represents the normal to the array. In addition to the signal received directly from the light source, background noise, denoted by $L_b$, from scattering may occur. Therefore, the effective boundary of the beam area is assumed to coincide with the area in which the magnitude of the signal is received from the light source and is equal to that of the background noise.

In addition to the attenuation underwater, the environmental background noise caused by interaction between the light beam and the water medium was modeled. Previous studies investigating the interaction of light beams through turbulent medium approximate the background noise using a bluffing function applied on the light beam. In certain embodiments, the background noise was modeled using a Hanning window:

$$h(n) = 0.5\left(1 - \cos\left(\frac{2\pi n}{N_w - 1}\right)\right)$$

where $N_w$ denotes the size of the Harming window and n is the sample number in the window, i.e. $0 \le n \le N_w - 1$. The Hanning window is convolved with the output image generated by the optical elements.

As light interacts with a detector element (e.g., photodiode) in the array, photons from the light are absorbed by the detector and current is generated. The current is then manipulated by the signal conditioning circuitry into a digital signal using, an analog-to-digital convertor (ADC). The electrical signal measured by the detector is dependent on the intensity the optical power) of the light beam and on the detector's responsivity (i.e., the electrical output of a detector for a given optical input). Also, noise sources produced in the hardware can make it difficult to extract useful information from the signal. The quality of the detector is characterized by the sensitivity which specifies the minimum intensity value that can be detected. In certain embodiments, noise equivalent power (NEP) is used to express the system's sensitivity. The output current produced from intensity L(r, η, Δλ) is collected by a detector with a solid angle, Ω, and an entrance aperture area, A:

$$i = R \cdot T \cdot L(r, \eta, \Delta\lambda) \cdot A \cdot \Omega$$

where R is the responsivity and T is the throughput of the detector.

In certain embodiments, the key hardware noise sources are: signal shot noise, $\sigma_s$, background shot noise, $\sigma_b$, dark-current shot noise, $\sigma_{dc}$, Johnson noise, $\sigma_j$, amplifier noise, $\sigma_j$, and ADC-generated quantization noise, $\sigma_q$. In certain embodiments, all sources of hardware noise are assumed to be mutually independent. Furthermore, in certain embodiments, it is assumed that all noise can be approximated as Gaussian with corresponding values of standard deviation. Accordingly, these noise sources may be combined as a root sum of squares and represented with a net noise current:

$$\sigma_n = \sqrt{\sigma_s^2 + \sigma_b^2 + \sigma_{dc}^2 + \sigma_j^2 + \sigma_q^2}$$

In addition to the electro-optical characteristics of the array component, the geometrical design of the array also affects the received intensity of the light signal. The incidence angle, θ, of the light ray reduces the level of radiance measured by the detector according to Lambert's cosine law (See, for example, FIG. 1B(2)):

$$L_\theta(r, \eta, \Delta\lambda) = L_n(r, \eta, \Delta\lambda) \cdot \cos(\theta)$$

where $L_n$ is the radiance at the surface normal.

In certain embodiments, the goal of the simulator was to analyze varying array designs for UUV optical detection of relative translation and rotation with respect to a reference coordinate frame. The criteria in evaluating the effectiveness of a detector array design involved: 1) determining the minimum number of detector elements required for robust UUV position and attitude determination and 2) verifying that the detector was able to acquire a unique signature for each UUV position/orientation combination with respect to the given light source.

In certain embodiments, the simulator calculates the light intensities at the individual optical elements based on the relative geometry between the light source and the detector. The simulator also takes into account the environmental and hardware effects described previously, in certain embodiments, the effective operational distance for underwater communication is dependent on water clarity. Although a broad spectral range of light (400 to 700 nm) can be used for optical communication, the radiation calculation in the simulator can use a narrower spectral range (e.g., between 500 to 550 nm), providing, maximum transmittance in clear to moderately clear waters.

Based on empirical measurements using, a 400 W metal halide lamp and a commercial grade Mounted Silicon Photodiode photodetector (NEP Range between $1 \times 10^{-14}$ to $5 \times 10^{-14}$ W·Hz$^{-1/2}$), a maximum operational distance of up to 20 m was assumed for extremely clear waters, which represented open ocean conditions (K=0.05 m$^{-1}$), and of up to 8 m for moderately clear waters, which represented tropical coastal waters (K=0.1 m$^{-1}$). Although the simulator provided results for larger angles, pitch and roll angles were limited to within 20°. This constraint was based on the assumption that most UUVs are built to be stable about their pitch and roll axes of rotation.

In certain embodiments, in the simulator of the present invention, an Earth-fixed reference frame is assumed, where as light source is centered at the origin (0,0,0). Several coordinates are identified in the x-y-z coordinate frame with respect to the UUV center of mass (COM). Several attitude orientations are also identified with respect to the Earth-fixed reference frame and defined by angles φ, θ, and ψ for roll, pitch, and yaw, respectively. In order to ensure appropriate sensor feedback for adequate control performance, the detector array should be able to detect a unique light, signal (pattern) for each combination of coordinate position and attitude orientation. In certain embodiments, this detection should be accurate to within 0.2 m of the true COM coordinate position and to within 10° of the true attitude orientation within 4 m-8 m range along the x-axis.

In certain embodiments, the array geometry is chosen based upon the dimensions of the UUV. The UUV in this study was assumed to be a rigid body of box-type shape with a width (starboard to port) and height (top to bottom) of 0.4 m and a length (from bow to stern) of 0.8 m, which is the size of a generic observation-class ROV used as a test platform. It is understood that various shapes and dimensions could be used depending on the desired application. In certain embodiments, the adapted coordinate axes convention is that of the Tait-Bryan angles, where the x-axis points toward the bow and the y-axis towards starboard, and the body-fixed z-axis points downward and completes the orthogonal triad.

As previously mentioned, two array shapes were compared in Applicants' studies: (1) a planar array and (2) a curved array. It is understood that a variety of shapes could be used. The geometry of the planar and curved arrays is defined below.

In the planar detector array, the detectors are defined relative to the UUV COM with respect to the local (body) coordinate flame. The center and the four corners of the planar array frame are defined as follows:

$$Arr_{center} = \left(COM_x + \frac{1}{z}, COM_y, COM_z\right)$$

$$Arr_{min(y),max(y)} = COM_y \pm \frac{w}{z}$$

$$Arr_{min(z),max(z)} = COM_z \pm \frac{h}{z}$$

where $COM_x$, $COM_y$, and $COM_z$ respectively define the x, y, and z coordinates of the follower COM, l is the length of the UUV, and w and h denote the width and the height of the vehicle, respectively. The lateral and vertical spacing (denoted as $p_y$ and $p_z$, respectively) between the individual detectors on the array can be expressed as:

$$p_y = \frac{w}{N-1}$$

$$p_z = \frac{h}{N-1}$$

It is assumed that the detector array is an N×N square where N is the number of optical elements. That is, the number of detectors in the rows and columns of the array are the same. Accordingly, the detector spacing, is also the same (i.e. $p_y = p_z$).

A hemispherical shape is used for the curved array. The number of detectors in the curved, array is initially defined based on the N×N planar array design. Then, if the detectors are projected onto the hemisphere surface, as in FIG. 1A, with a fixed radius r:

$$x_{ij} = \sqrt{r^2 - y_{ij}^2 - z_{ij}^2}$$

where $x_{ij}$ is the position of the detector element on the x-axis and $y_{ij}$ and $z_{ij}$ are the coordinates of the array that is projected onto the bow of the follower UUV. In addition, i and j are the indices that represent the row and column number of the array, respectively. The radius, r, of the hemisphere is defined from its focal point, F, which is the center of the hemisphere.

$$F_x = COM_x + \frac{1}{z}$$

$$F_y = COM_y$$

$$F_z = COM_z$$

In certain embodiments, the hemispherical radius of the curved array is kept longer than the width or height of the planar array in order to have the same number of elements for both array designs. In certain embodiments, the main difference between the two array designs is that all of the optical elements in the planar array are oriented in the same direction, while the detectors in the curved array are normal to the surface of the array frame and thus allow a larger range of incidence angles.

The construction of a realistic light signal (as measured by the array detectors) is based on the radiometric and hardware considerations for each detector. The radiometric calculations are based on the distance (using the inverse square law and Beer's law) and orientation (using Lamberts cosine law) of each detector with respect to the light source. Using the detector's characteristics and the associated electronics, the artificially created incident light was numerically converted into a digital signal. In certain embodiments, the specifications of two types of photodiodes were used as references (Hamamatsu SM05PD1A and Hamamatsu SM05PD2A). The resulting electronic signal was represented as a 10-bit (0-1023) sensor output value (thus, introducing quantization error). In certain embodiments, environmental background noise is artificially added to the signal using a Hanning window of size $N_w=11$. Also, a random net noise current of $\sigma_n=10^{-6}$ can be added to the electronic signal. In certain embodiments, the final digital signal is used to generate an image pattern, which, in turn, is to be used by the array detectors to identify the position and the orientation, of the UUV.

Although the UUV is a six DOF system, it is assumed that it is not possible to achieve relative roll angle detection (because of axial symmetry about the body x-axis). In certain embodiments, only five parameters are provided to the simulator as input: translation along, all three coordinate axes, rotation of the pitch angle, $\theta$, and rotation of the yaw angle, $\psi$. Accordingly, the image output of the simulator is analyzed using five parameters that can be related to input parameters (See, for example, FIG. 13): the peak light intensity value, l, the corresponding location of the horizontal detector, j, and vertical detector, k, at peak intensity, the location, of the skewness of the horizontal intensity profile gradient, $Sk_h$, and skewness of the vertical intensity profile gradient, $Sk_v$. The peak value is normalized with respect to a given maximum detectable intensity (0.0<I<1.0). The locations of the horizontal and vertical detectors are defined with respect to the central detector (j=(N+1)/2, k=(N+1)/2).

Based on the location of the peak intensity, the slopes of the horizontal and vertical intensity are calculated. In certain embodiments. The slope of the profile is used rather than the profile itself because the slope also provides the directionality of the beam profile (i.e., negative or positive) in addition to the asymmetry of the profile. The images and the corresponding parameters for the planar and the curved array of size 21×21 for a given coordinate location and yaw rotation are shown in FIG. 13 and FIG. 14, respectively.

Figure 13:
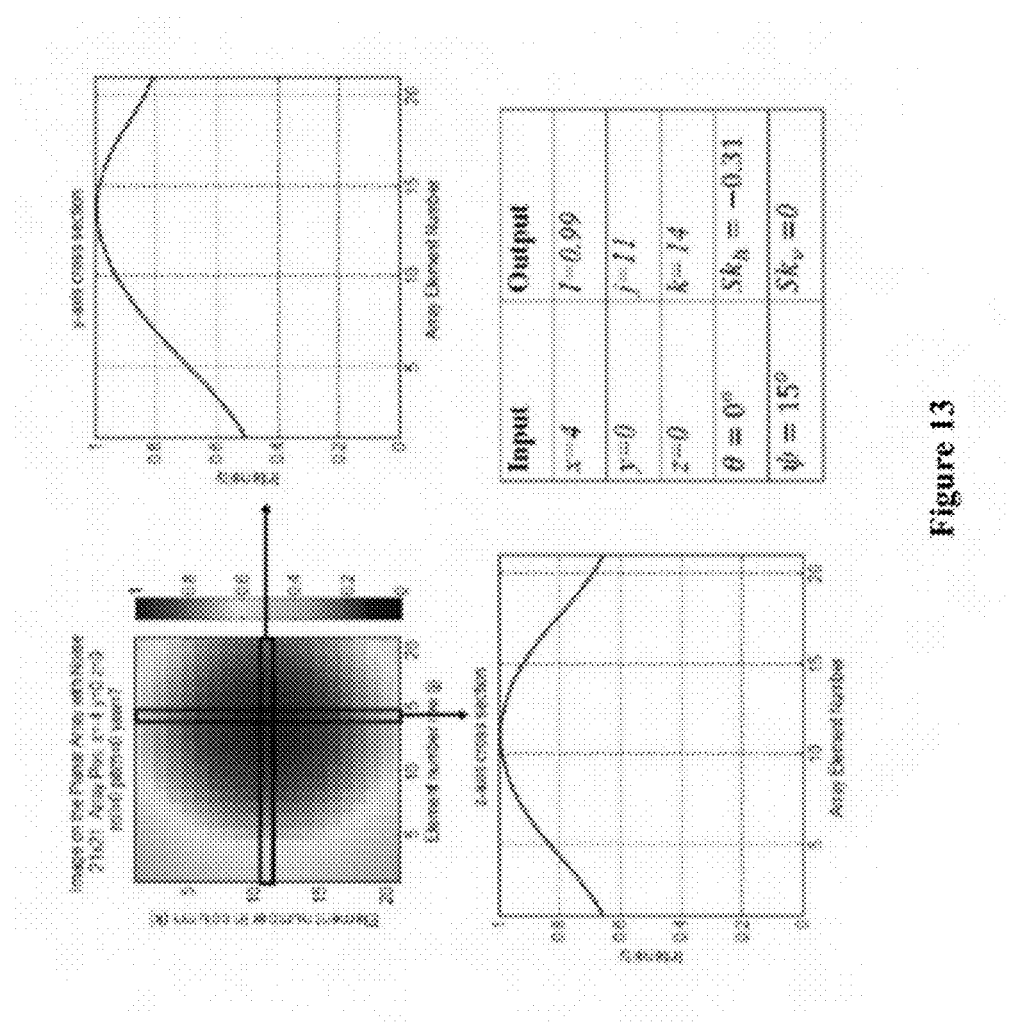
FIG. 13 shows key image parameters and intensity profiles for a planar array detector unit of one embodiment of the present invention with hardware and environmental background noise.

Referring to FIG. 13, key image parameters and intensity profiles for a planar array detector unit with hardware and environmental background noise are shown: (top left) Output image from the simulator, (top right) Horizontal profile, (bottom left) Vertical profile, (bottom right) Input values used to generate output image and key parameters describing, the output image.

Figure 14:
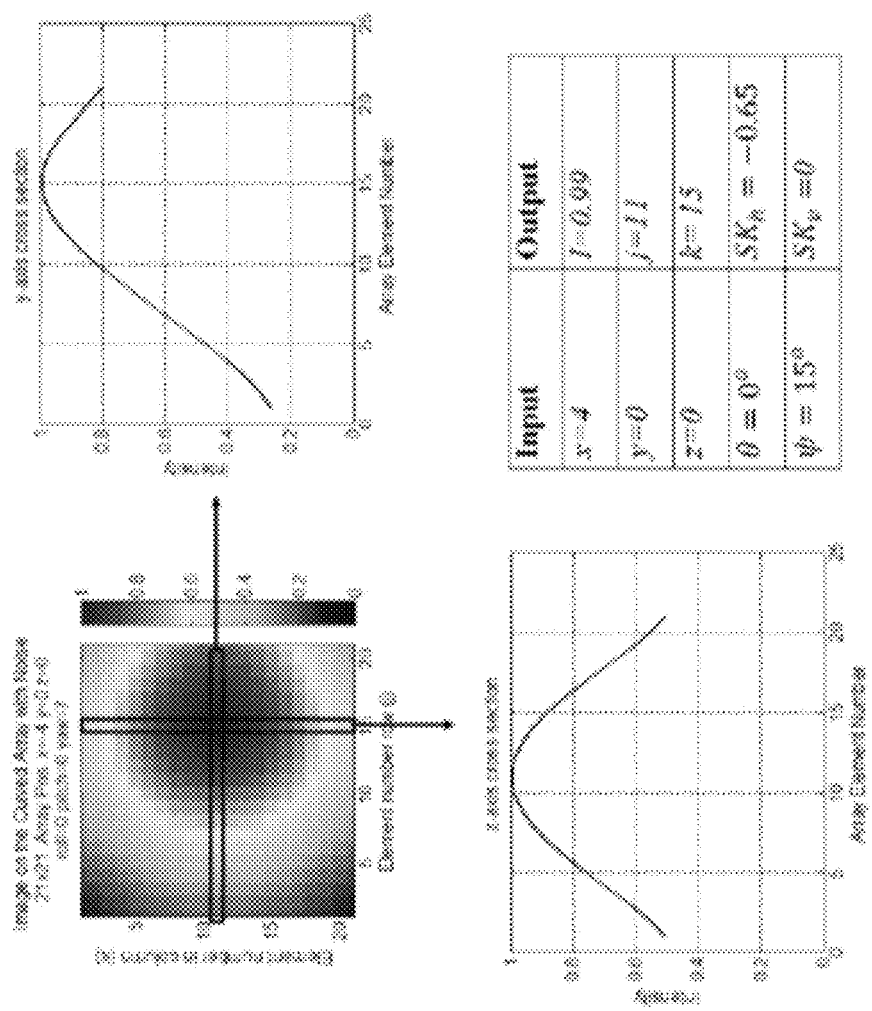
FIG. 14 shows key image parameters and intensity profiles for a curved array detector unit of one embodiment of the present invention with hardware and environmental background noise.

Referring to FIG. 14, key image parameters and intensity profiles for a curved array detector unit with hardware and environmental background noise are shown: (top left) Output image from the simulator, (top right) Horizontal profile, (bottom left) Vertical profile, (bottom right) Input values used to generate output image and key parameters describing output image.

Figure 15:
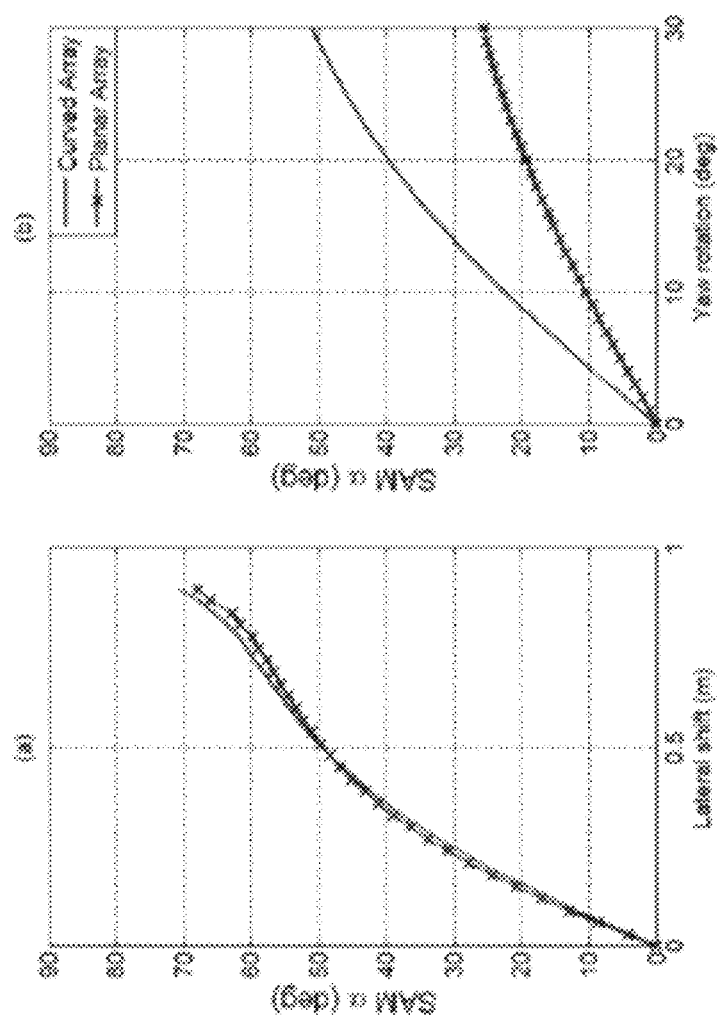
FIG. 15 shows comparative resemblance results of one embodiment of the present invention (SAM angles) for 21×21 element curved and planar array (at x=4 m) as a function of: (a) lateral translation, (b) yaw rotation.

As a first step for the selection of the array design, the geometry of the detector array was evaluated. A performance evaluation between planar and curved arrays was conducted, where each detector array contained, a 21×21 grid of detector elements. Both detector arrays were evaluated for their ability to detect changes in position and orientation, i.e., changes in SAM angle. In certain embodiments, changes in position are evaluated as the UUV translates along the y-axis from a given origin (0 m) to an offset of 0.9 m in 0.03 m increments. Similarly, changes in orientation are evaluated by rotating the UUV about the z-axis, yaw rotation, from its initial reference (0°) to 30° in increments of 1°. Resemblance results that were used to identify UUV positional and attitude changes based on measured signals (images) collected by the detector array at 4 m are presented in FIG. 15. The comparative results for changes in position using the SAM algorithm show similar performance between the two array geometries, where the curved array performs slightly better (2°) at shifts greater than 0.6 m. However, an investigation of the results for changes in orientation reveals that the curved array is more sensitive to changes in orientation than the planar array. The SAM angle results for the curved array shows changes of 12° at 5° yaw rotations and changes of 22° at 10° rotations, whereas the planar array shows changes in SAM angle of 5° at 5° yaw rotations and 11° at 10° rotations. Based on these results, it is deduced that the curved array geometry may be more suitable for distinguishing changes in position and especially, orientation of a UUV platform with respect to a reference light beacon.

Figure 16:
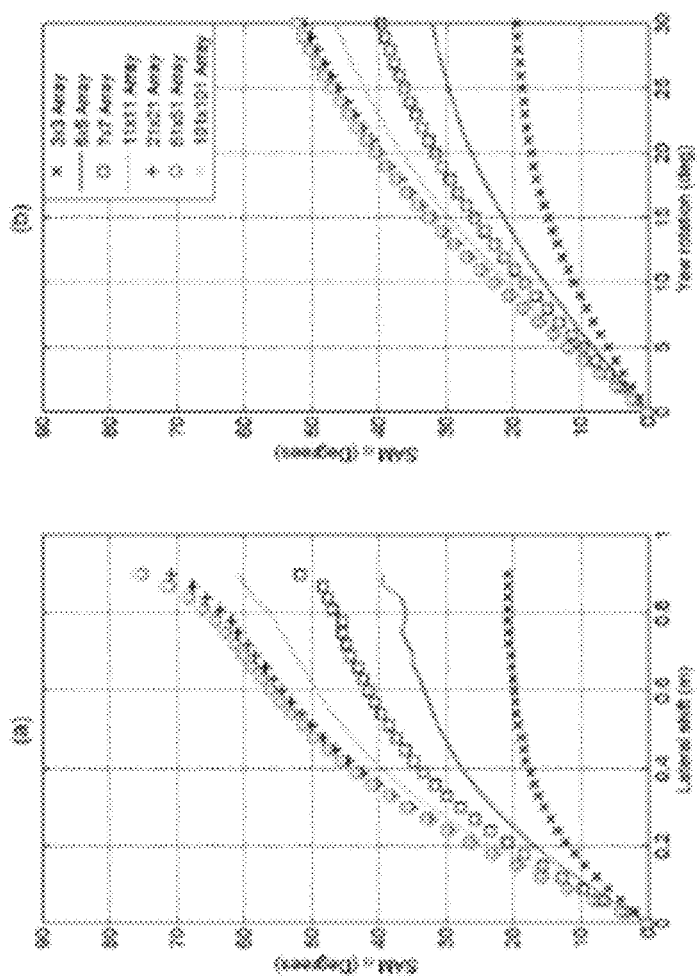
FIG. 16 shows comparative resemblance results of one embodiment of the present invention (i.e., SAM angle) with respect to varying array sizes (incorporating environmental and background noise): (a) SAM angle with respect to lateral motion (b) SAM angle with respect to angular rotation.
Figure 17:
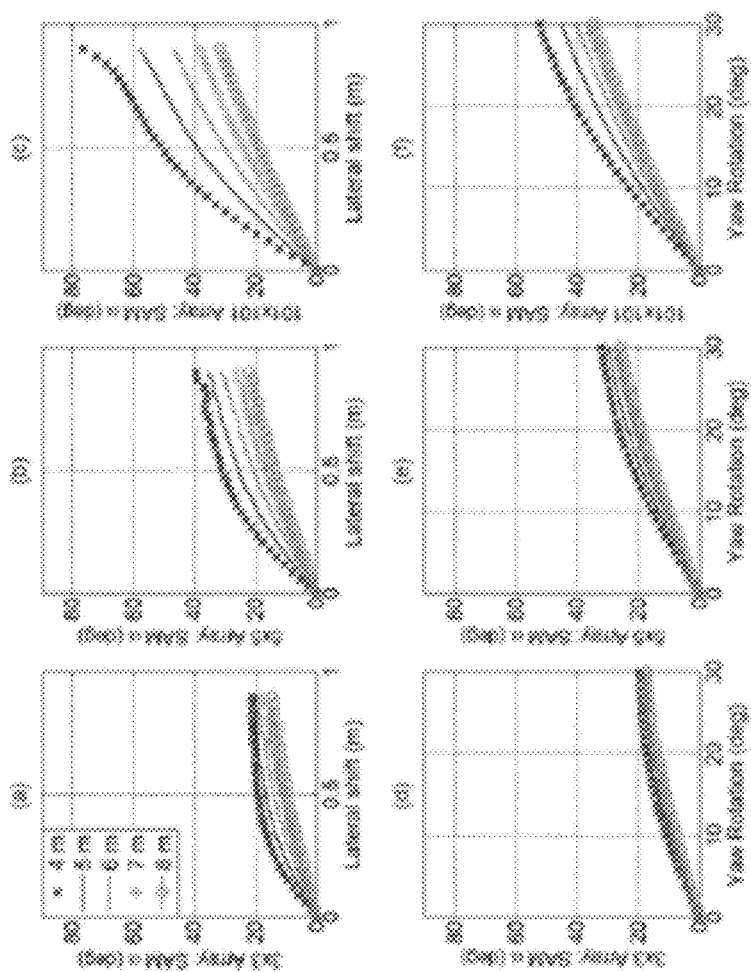
FIG. 17 shows comparative resemblance results of one embodiment of the present invention (i.e., SAM angle) with respect to operational distance (incorporating environmental and background noise): (a-c) lateral shift, (d-f) yaw rotation—(a, d) 3×3 array (b, e) 5×5 array (c, f) 101×101 array.

In certain embodiments, after the geometry of the detector array is defined, relationships between the ability to distinguish changes in position and orientation from the output images and the number of elements in the curved detector array are evaluated. The comparisons included different array sizes, ranging from a 3×3 size array up to a 101×101 size array at distances ranging from 4 m to 8 in to the light source. The comparative results at 4 m (FIG. 16) show that changes in positional and rotational shifts can be detected by an array with the size of at least 5×5 optical elements. Based on a threshold of a 15° SAM angle, a smaller array would fail to detect translational shifts smaller than 0.2 m or rotational changes smaller than 10°. It should also be noted that no significant changes in detection capability were observed for array sizes greater than 7×7. The effect of operational distances greater than 4 m is shown in FIG. 17. Although the ability of the curved array to distinguish between the images decreases as the operational distance increases, the SAM algorithm results for 5×5 array at 8 m are still above 10° for a 10° yaw rotation and above 6° for 0.2 m translation.

In certain embodiments, the simulator of the present invention has a modular design to allow for the addition and changing of hardware and environmental parameters. In certain embodiments, the simulator can evaluate other array geometries with a variety of sizes, in addition to the two traditional shapes considered herein. The simulator results show that a curved array with a minimum array size of 5×5 elements is sufficient for distinguishing positional changes of 0.2 m and rotational changes of 10°. For the distinction of smaller changes, a larger array size may be useful.

In certain embodiments, a follower UUV is assumed to have five DOF maneuverability with respect to a given light source: three DOF translation (i.e., translations along the x, y, and z axes) and two DOF rotation (yaw and pitch). In certain embodiments, the transmitter unit has only one light source with a Gaussian spatial intensity distribution. This can complicate the decoupling of roll changes (rotation about the body-fixed x-axis) from either pitch or yaw. This is due to the axial symmetry of the light beam. In certain embodiments, the use of multiple light sources or a light source with a unique intensity distribution can enable roll rotation sensing.

It is important to note that the simulator assumes that the water column is uniform with systematic background noise. As a result, the output images of the light field intersecting with the detector array have a resemblance with a Gaussian beam pattern. However, disturbances in the medium (e.g., sediment plume) may cause the beam pattern to be distorted. This point should be taken into account in the development of control algorithms for UUV navigation. Otherwise, the control algorithms may misinterpret the acquired image and direct the follower UUV away from the guiding beam. The simulator results show that detector noise does not contribute significantly to the image output. Other detectors with a larger noise level may contribute more to output images.

Figure 18:
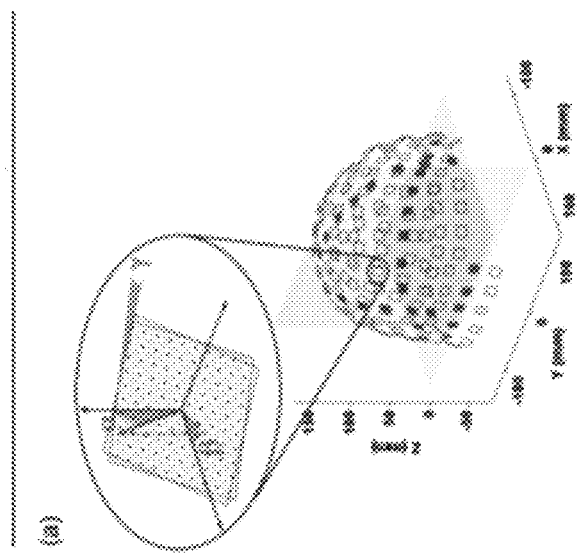
FIG. 18 shows arrays for embodiments of the present invention.
Figure 18:
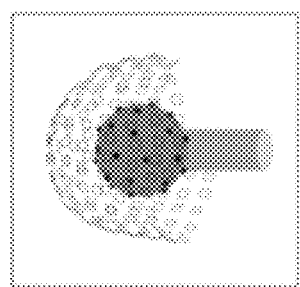
Figure 18:
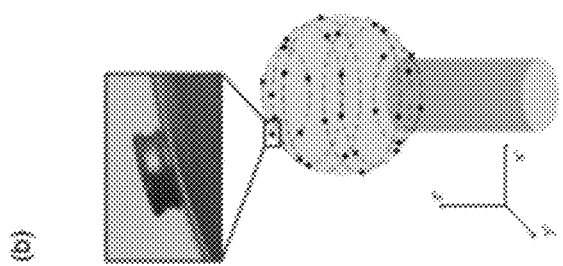
Figure 19:
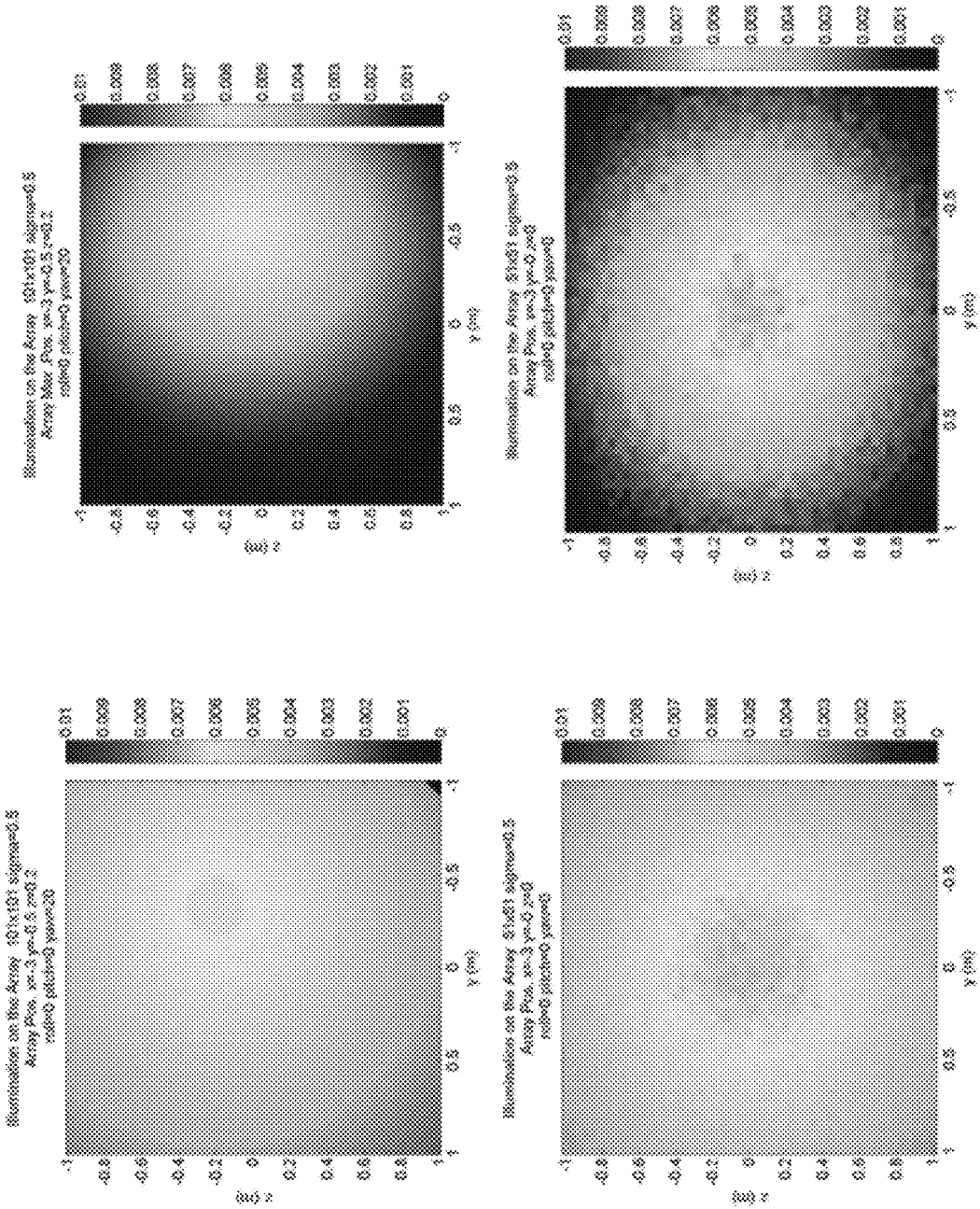
FIG. 19 shows detected images for embodiments of the present invention.
Figure 20:
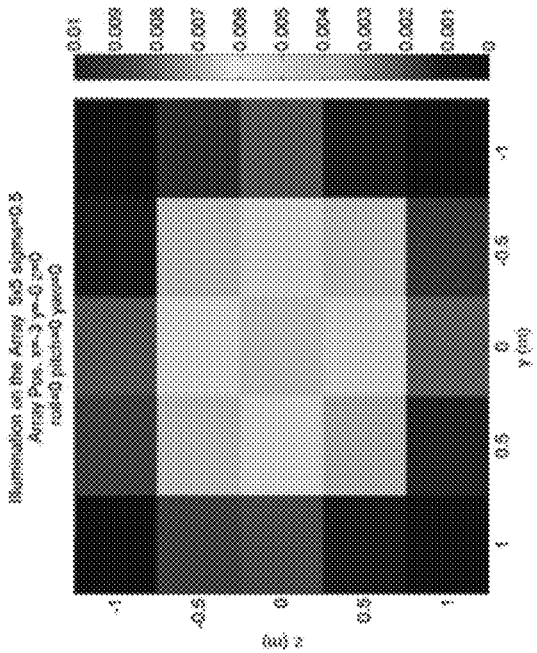
FIG. 20 shows detected images for embodiments of the present invention.
Figure 20:
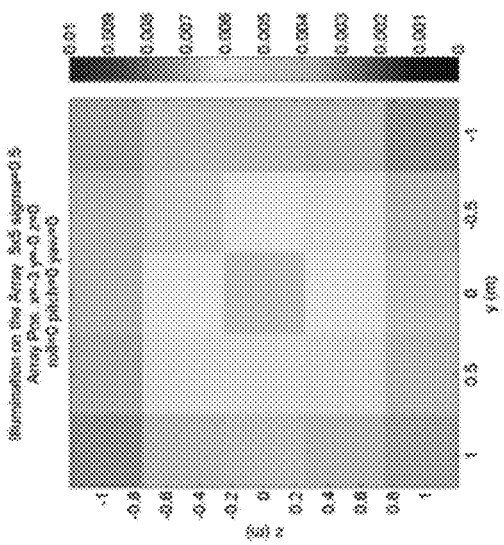
Figure 21:
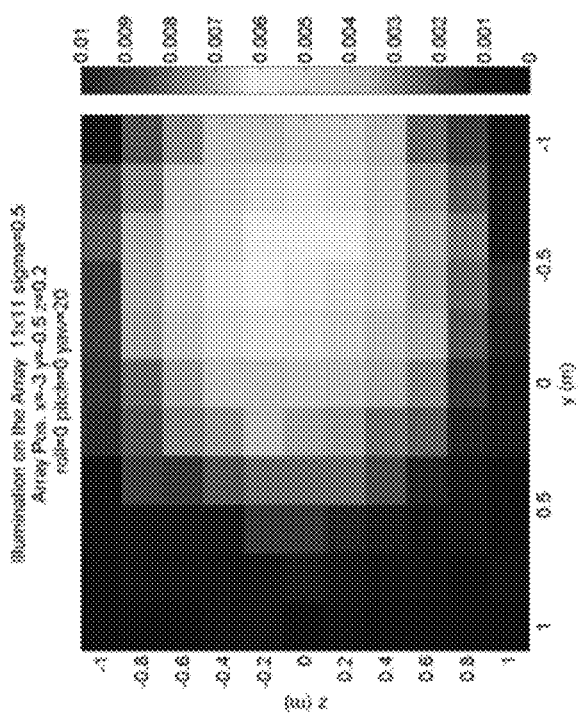
FIG. 21 shows detected images for embodiments of the present invention.
Figure 22:
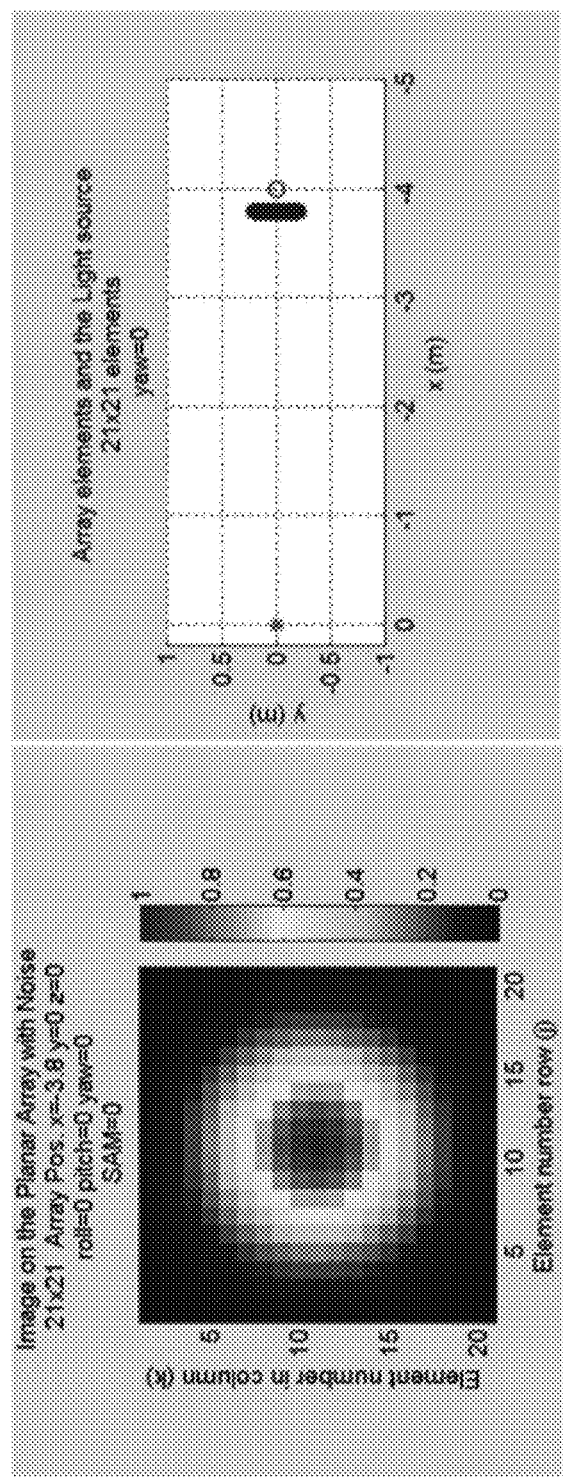
FIG. 22 shows detected images for embodiments of the present invention.

Referring to FIG. 18, arrays for certain embodiments of the present invention are shown. Referring to FIGS. 19-22, various detected images at 4 m for certain embodiments of the present invention are shown. More particularly, referring to FIG. 19, the top two images represent a 101×101 array, and the two bottom images represent a 51×51 array. Still referring to FIG. 19, the images on the left are from planar arrays and the images on the right are from curved arrays. The bottom images in FIG. 19 also include noise. Referring to FIG. 20, 5×5 arrays are shown, where the left image is from a planar array with noise and the image on the right is from a curved array with noise. Referring to FIG. 21, a 11×11 array is shown. Referring to FIG. 22, a 21×21 planar array is shown.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed:

1. An optical communication instrumentation system for leader-follower formations of unmanned underwater vehicles, comprising:
    a leader unmanned underwater vehicle and a follower unmanned underwater vehicle;
    one or more light sources mounted on the leader unmanned underwater vehicle producing a 3-dimensional light field;
    an optical detector array mounted on the follower unmanned underwater vehicle for detecting the light field; and
    an algorithm for controlling and detecting distance and controlling motion and orientation between the leader unmanned underwater vehicle and the follower unmanned underwater vehicle.

2. The optical communication instrumentation system for leader-follower formations of unmanned underwater vehicles of claim 1, wherein the leader unmanned underwater vehicle is a remote underwater vehicle and the follower unmanned underwater vehicle is an automated underwater vehicle.

3. The optical communication instrumentation system for leader-follower formations of unmanned underwater vehicles of claim 1, wherein the leader unmanned underwater vehicle is a first automated underwater vehicle and the follower unmanned underwater vehicle is a second automated underwater vehicle.

4. The optical communication instrumentation system for leader-follower formations of unmanned underwater vehicles of claim 1,
wherein the follower unmanned underwater vehicle is a first follower unmanned underwater vehicle, and
further comprising at least a second follower unmanned underwater vehicle.

5. The optical communication instrumentation system for leader-follower formations of unmanned underwater vehicles of claim 1, wherein the optical detector array is at least one of a planar array or a curved array.

6. The optical communication instrumentation system for leader-follower formations of unmanned underwater vehicles of claim 5, wherein an array size of the optical detector array is between a 3×3 array and a 101×101 array.

7. The optical communication instrumentation system for leader-follower formations of unmanned underwater vehicles of claim 1, wherein the algorithm is configured to regulate the distance between the leader unmanned underwater vehicle and the follower unmanned underwater vehicle to a specified reference value.

8. The optical communication instrumentation system for leader-follower formations of unmanned underwater vehicles of claim 7, wherein the specified reference value is between 4.5 m and 8.5 m.

9. The optical communication instrumentation system for leader-follower formations of unmanned underwater vehicles of claim 1, further comprising a control algorithm to maintain stability.

10. The optical communication instrumentation system for leader-follower formations of unmanned underwater vehicles of claim 9, wherein the control algorithm is a proportional derivative control algorithm.

11. The optical communication instrumentation system for leader-follower formations of unmanned underwater vehicles of claim 1, wherein light received by the optical detector array is filtered using a 500-550 nm band pass filter.

12. The optical communication instrumentation system for leader-follower formations of unmanned underwater vehicles of claim 1, wherein a trajectory generated by the algorithm is smoothed using a Kalman filter.

13. The optical communication instrumentation system for leader-follower formations of unmanned underwater vehicles of claim 1, wherein the optical detector array is configured to determine and distinguish at least five degree of freedom relative motion between unmanned underwater vehicles.

14. The optical communication instrumentation system for leader-follower formations of unmanned underwater vehicles of claim 1, wherein the algorithm is configured to detect translational motion above water utilizing at least one beam of light.

15. The optical communication instrumentation system for leader-follower formations of unmanned underwater vehicles of claim 4, wherein the algorithm is a dynamic positioning algorithm.

16. The optical communication instrumentation system for leader-follower formations of unmanned underwater vehicles of claim 14, wherein the dynamic positioning algorithm is used in combination with a lookup table in positioning the first follower unmanned underwater vehicle and the second follower unmanned underwater vehicle.

17. The optical communication instrumentation system for leader-follower formations of unmanned underwater vehicles of claim 1, wherein the optical communication instrumentation system is configured to detect relative light intensity changes in the optical detector array.

18. The optical communication instrumentation system for leader-follower formations of unmanned underwater vehicles of claim 15, wherein the algorithm is configured to use parameters comprising:
a Spectral Image Mapper, a skewness of a vector of a resulting intensity profile, a row number and a column number of an image pixel with a highest intensity, a skewness of a horizontal slope of pixel intensity, and a skewness of a vertical slope of pixel intensity.

19. A method of directing the optical communication instrumentation system for leader- follower formations of unmanned underwater vehicles of claim 1, comprising:
providing, to the leader unmanned underwater vehicle, reference input to travel to given waypoints; and
providing, to the leader unmanned underwater vehicle, step input changes.

20. The method of claim 19, further comprising generating a time varying trajectory from motion of the leader unmanned underwater vehicle to guide the follower unmanned underwater vehicle.

21. The method of claim 20, further comprising estimating an x-coordinate separately using a procedure comprising:
taking a first estimate of the x-coordinate based upon a total intensity of detector array elements; and
correcting the first estimate of the x-coordinate using an estimated value of y, z, θ, and ψ to calculate a second estimate of the x-coordinate using $$x_{est} = x_{est1} - \sqrt{y_{est}^2 + z_{est}^2} \text{"} 1 \sin\theta \cos\psi.$$

* * * * *